(12) United States Patent
Wulf

(10) Patent No.: US 10,875,112 B1
(45) Date of Patent: Dec. 29, 2020

(54) SAW DUST COLLECTION SYSTEM

(71) Applicant: Alexander S. Wulf, Dublin, OH (US)

(72) Inventor: Alexander S. Wulf, Dublin, OH (US)

( * ) Notice: Subject to any disclaimer, the term of this patent is extended or adjusted under 35 U.S.C. 154(b) by 595 days.

(21) Appl. No.: 15/710,994

(22) Filed: Sep. 21, 2017

Related U.S. Application Data

(60) Provisional application No. 62/399,353, filed on Sep. 24, 2016.

(51) Int. Cl.
*B23D 59/00* (2006.01)
*B23Q 11/00* (2006.01)

(52) U.S. Cl.
CPC ........ *B23D 59/006* (2013.01); *B23Q 11/0046* (2013.01)

(58) Field of Classification Search
CPC .. B27B 5/16; B27B 5/165; B27B 5/29; B23Q 11/0042; B23Q 11/0046; B23Q 11/0067; B23Q 11/0071; B23D 59/006; B27C 5/02; B27C 5/04; A47L 5/38; A47L 7/0095; B25H 1/20; B08B 15/02; B08B 15/023; B08B 15/04
USPC ..................................................... 454/49–67
See application file for complete search history.

(56) References Cited

U.S. PATENT DOCUMENTS

| | | |
|---|---|---|
| 4,108,509 A | 8/1978 | Piet et al. |
| 4,356,884 A | 11/1982 | Mortimer |
| 4,514,936 A | 5/1985 | Hurtado |
| 4,780,927 A | 11/1988 | Clayton |
| 4,928,348 A | 5/1990 | Clayton |
| 5,158,001 A | 10/1992 | Udelhofen et al. |
| 5,336,128 A | 8/1994 | Birdsong |
| 5,381,842 A * | 1/1995 | Aigner ..................... B23Q 1/76 144/145.2 |
| 5,487,768 A | 1/1996 | Zytka et al. |
| 5,971,839 A | 10/1999 | Schmelzer |
| 5,984,990 A | 11/1999 | McDonald |

(Continued)

OTHER PUBLICATIONS

"The iQ1014-S Portable Dust Collection System", IQ Power Tools Website, Web page <https://iqpowertools.com/professional-power-tools/iq-1000/>, 8 pages, dated at least as early as May 19, 2017, retrieved from www.iqpowertools.com website on Sep. 27, 2019.

(Continued)

*Primary Examiner* — Matthew Katcoff
(74) *Attorney, Agent, or Firm* — The Law Office of Patrick F. O'Reilly III, LLC

(57) ABSTRACT

A saw dust collection system is disclosed herein. The saw dust collection system comprises a vacuum source configured to create a vacuum for extracting saw dust and particles from a cutting area surrounding a saw; a saw platform assembly comprising a floor for supporting the saw thereon; a hood member disposed over the saw platform assembly, at least a portion of the hood member being transparent so that a user of the saw is able to see through the hood member, the hood member and the saw platform assembly together defining a saw compartment for containing the saw therein and enclosing the cutting area around the saw so as to prevent the saw dust and particles from entering the environment outside of the saw dust collection system; and a pair of workpiece insert slots configured to allow a workpiece to extend through opposite sides of the saw dust collection system.

20 Claims, 26 Drawing Sheets

(56) References Cited

U.S. PATENT DOCUMENTS

| | | | |
|---|---|---|---|
| 6,383,242 B1 | 5/2002 | Rogers et al. | |
| 6,517,429 B1 | 2/2003 | O'Connell et al. | |
| 6,792,878 B2 | 9/2004 | Cheng | |
| 6,796,208 B1 | 9/2004 | Jorgensen | |
| 7,513,922 B2* | 4/2009 | Cheng | B01D 46/22 222/146.5 |
| 7,669,622 B2* | 3/2010 | Liao | B23Q 11/0046 144/117.1 |
| 8,006,727 B1 | 8/2011 | Urban et al. | |
| 8,082,825 B2* | 12/2011 | Butler | B23D 59/006 83/471.3 |
| D663,184 S | 7/2012 | Wait | |
| 8,235,773 B2 | 8/2012 | Yin | |
| 8,561,512 B2 | 10/2013 | Loveless et al. | |
| 8,726,774 B1 | 5/2014 | Kellum | |
| 8,869,786 B2 | 10/2014 | Faiweather et al. | |
| 9,285,132 B2* | 3/2016 | Waulters | F24F 7/007 |
| 10,245,663 B2* | 4/2019 | Koegel | B23D 59/006 |
| 2005/0050669 A1 | 3/2005 | Castello | |
| 2006/0042439 A1 | 3/2006 | Powell | |
| 2007/0151067 A1 | 7/2007 | Cheng | |
| 2010/0037740 A1 | 2/2010 | Lin | |
| 2010/0116261 A1 | 5/2010 | Fairweather et al. | |
| 2013/0084788 A1* | 4/2013 | Tartaglia | A01K 1/031 454/49 |

OTHER PUBLICATIONS

"Miter Saw Table2", Kreg Owners' Community Website, Web page <https://kregjig.ning.com/photo/miter-saw-table2?context=user>, 7 pages, dated Sep. 26, 2010, retrieved from www.kregjig.ning.com website on Sep. 27, 2019.

"Dust Hood for the Sliding Miter Saw", Lumberjocks Woodworking Showcase Website, Web page <https://www.lumberjocks.com/projects/78555>, 3 pages, dated Jan. 26, 2013, retrieved from www.lumberjocks.com website on Sep. 27, 2019.

"How to Make a Compound Miter Saw Dust Hood", One Project Closer Website, Web page <https://www.oneprojectcloser.com/how-to-make-compound-miter-saw-dust-hood/>, 22 pages, dated Jul. 26, 2012, retrieved from www.oneprojectcloser.com website on Sep. 27, 2019.

"Rousseau—5000 Dust Solution for Miter Saws", Woodcraft Website, Web page <https://www.woodcraft.com/products/rousseau-5000-dust-solution-for-miter-saws>, 6 pages, dated at least as early as Mar. 7, 2014, retrieved from www.woodcraft.com website on Sep. 27, 2019.

* cited by examiner

Section A-A

Section B-B

SAW DUST COLLECTION SYSTEM

CROSS-REFERENCE TO RELATED APPLICATIONS

This patent application claims priority to, and incorporates by reference in its entirety, U.S. Provisional Patent Application No. 62/399,353, entitled "SAW DUST HOOD AND VACUUM", filed on Sep. 24, 2016.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

The invention generally relates to a saw dust collection system. More particularly, the invention relates to a saw dust collection system for containment of saw dust and particles generated by the cutting of a workpiece with a saw.

2. Background

Existing residences and businesses are often renovated. Renovation, also known as remodeling, is the process of improving an outdated structure whether commercial or residential. Currently, there is a high demand for remodeling aging structures, particularly office space and in homes across the nation and around the world. Most often the undertaking of remodeling a structure involves construction while a resident or tenant is living or working in the structure, thus exposing them to dust if materials are cut inside the residence, grime, outdoor weather elements tracked in from a worker making consistent trips between inside and outside the residence if cutting is limited to outdoors, dust tracked into the residence from outdoors, and temporary dysfunction of bathroom and kitchen fixtures, appliances and limited access to certain areas under construction for a prolonged period of time significantly inconveniencing the residents or occupants. This can certainly be an awkward and discomforting process for the occupant living in the residence. Remodeling projects frequently involve some type of flooring installation, which may result in some of all of the issues described above.

When the project involves new construction, whether it is a house or new commercial building, a flooring installation takes place in generally the same manner as a renovation project, except there are no residents inside the structure. In some instances, the flooring or remodeling professional has an option to choose to make cuts of the flooring materials inside, thus exposing himself or herself to dust and injuries resulted from operating cutting power tools (i.e., saws). Although, in many instances, the flooring professionals working in the newly built structures set up cutting stations outside because they understand the danger associated with breathing the dust-enriched air inside the remodeling room.

In particular, during the wood cutting process (such as cutting for cabinet construction, wood floors, laminate flooring or any laminate materials of other configurations, quarter round materials essential for flooring installation completion and base boards), saw dust and fine particles can significantly accumulate throughout the premises, collecting not only on surfaces, but on furniture, clothes, food, pet food and water bowls, shelves, books, curtains, window blinds, domestic living plants and flowers, and throughout the air, which is repugnant to maintaining sufficiently breathable air. Because of this, carpenters are forced to resort to cutting wood and other materials outside the premises exposing their tools and materials to theft by criminal elements, inappropriate use or misuse by unauthorized individuals while the power tool(s) is unattended, and to the outdoor weather elements that can ruin or destroy the electrical power tools. In some projects, the walking distance to and from the cutting area may vary from ten (10) feet to a much greater distance, and consequently project completion time drastically increases when walking outside the structure significantly increases travel time between cuts, which also results in additional costs for the completion of the project.

In addition to the issues explained above, there are also safety and health concerns for remodeling professionals. As one example, for a flooring professional, the flooring installation process involves several physical actions that reduce the stamina of the installer, and may negatively affects his or her health. During a typical flooring installation project, when professional completes the row ending at the wall, he or she is on his or her knees. Typically, the next step is to mark the board, and then proceed with the following steps: (1) rise from the kneeling position to an upright position, (2) turn around, (3) walk to the saw, (4) make the cut, (5) turn around again, (6) walk back to the installation location, and (7) return to a kneeling position in order to place material, and complete the row. These steps typically repeat a hundred or more times during the installation process. This physical input often wears the installer out by the afternoon, reduces his or her stamina, and exhausts the physical resources of the installer.

The invention described hereinafter provides a unique, effective system for significantly reducing one or more of the abovedescribed problems, or completely eliminating them. The difficulties inherent in the art are therefore overcome in a way which is simple, user friendly, and efficient so as to provide better and more advantageous results.

BRIEF SUMMARY OF EMBODIMENTS OF THE INVENTION

Accordingly, the present invention is directed to a saw dust collection system that substantially obviates one or more problems resulting from the limitations and deficiencies of the related art.

In accordance with one or more embodiments of the present invention, there is provided a saw dust collection system for containment of saw dust and particles generated by the cutting of a workpiece with a saw. The saw dust collection system includes a vacuum source, the vacuum source configured to create a vacuum for extracting the saw dust and particles from a cutting area surrounding the saw; a saw platform assembly, the saw platform assembly comprising a floor for supporting the saw thereon, the saw platform assembly further defining a vacuum port fluidly coupled to the vacuum source; a hood member disposed over the saw platform assembly, at least a portion of the hood member being transparent so that a user of the saw is able to see through the hood member, the hood member and the saw platform assembly together defining a saw compartment for containing the saw therein and enclosing the cutting area around the saw so as to prevent the saw dust and particles from entering the environment outside of the saw dust collection system; and a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system.

In a further embodiment of the present invention, the hood member further comprises a hand and arm port so as to allow the user to access the saw disposed in the saw compartment.

In yet a further embodiment, the vacuum port of the saw platform assembly is disposed in the floor of the saw platform assembly.

In still a further embodiment, at least one of the workpiece insert slots comprises a flexible sealing member disposed therein, the flexible sealing member configured to prevent the saw dust and particles from entering the environment outside of the saw dust collection system.

In accordance with one or more other embodiments of the present invention, there is provided a saw dust collection system for containment of saw dust and particles generated by the cutting of a workpiece with a saw. The saw dust collection system includes a vacuum assembly, the vacuum assembly including a vacuum source, the vacuum source configured to create a vacuum for extracting the saw dust and particles from a cutting area surrounding the saw; a saw platform assembly detachably coupled to the vacuum assembly, the saw platform assembly comprising a floor for supporting the saw thereon, the saw platform assembly further defining a vacuum port fluidly coupled to the vacuum source; a hood member detachably coupled to the saw platform assembly, at least a portion of the hood member being transparent so that a user of the saw is able to see through the hood member, the hood member and the saw platform assembly together defining a saw compartment for containing the saw therein and enclosing the cutting area around the saw so as to prevent the saw dust and particles from entering the environment outside of the saw dust collection system; and a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system. In these one or more other embodiments, each of the vacuum assembly, the saw platform assembly, and the hood member is configured to be separately carried by the user to a jobsite, and then assembled at the jobsite prior to the user performing cutting operations with the saw.

In a further embodiment of the present invention, the vacuum assembly of the saw dust collection system is configured to be interchangeably used with a plurality of different saw platform assemblies containing different types of saws therein, thereby enabling the user to selectively attach the vacuum assembly to a selected one of the saw platform assemblies being used at the jobsite at a particular time.

In yet a further embodiment, the saw platform assembly further comprises a plurality of first latch portions and the vacuum assembly further comprises a plurality of second latch portions, respective ones of the plurality of first latch portions configured to be coupled to respective ones of the plurality of second latch portions so as to allow the saw platform assembly to be detachably coupled to the vacuum assembly without the use of tools.

In still a further embodiment, the saw platform assembly further comprises a workpiece hold-down subassembly configured to enable the user to hold the workpiece in place while the workpiece is being cut by the saw, the workpiece hold-down subassembly comprising at least one handle member disposed on the exterior of the saw platform assembly.

In yet a further embodiment, the saw platform assembly further comprises a plurality of light emitting devices for illuminating the saw compartment containing the saw.

In still a further embodiment, the plurality of light emitting devices are in the form of a plurality light-emitting diode lights.

In yet a further embodiment, the vacuum assembly further comprises a housing with a plurality of walls, at least one of the walls of the housing comprising a speaker for playing music at the jobsite, the speaker configured to be operatively coupled to a portable digital device of the user by means of a wireless personal area network.

In still a further embodiment, the vacuum assembly further comprises a first electrical connector for providing power to the vacuum source and at least one first power button for activating and/or deactivating the vacuum source, and wherein the saw platform assembly further comprises a second electrical connector for providing power to the saw and at least one second power button for activating and/or deactivating the saw, the first and second electrical connectors enabling the vacuum source and the saw to be powered from different electrical receptacles of a residential or commercial building.

In yet a further embodiment, the saw platform assembly further comprises a universal saw mounting frame that is configured to support one of a plurality of different types of saws mounted thereon.

In accordance with yet one or more other embodiments of the present invention, there is provided a saw dust collection system for containment of saw dust and particles generated by the cutting of a workpiece with a saw. The saw dust collection system includes a vacuum assembly, the vacuum assembly including a vacuum source, the vacuum source configured to create a vacuum for extracting the saw dust and particles from a cutting area surrounding the saw, the vacuum assembly further comprising an external vacuum port fluidly coupled to the vacuum source, the external vacuum port configured to receive a vacuum hose; a saw platform assembly coupled to the vacuum assembly, the saw platform assembly comprising a floor for supporting the saw thereon, the saw platform assembly further defining an internal vacuum port fluidly coupled to the vacuum source; a hood member coupled to the saw platform assembly, at least a portion of the hood member being transparent so that a user of the saw is able to see through the hood member, the hood member and the saw platform assembly together defining a saw compartment for containing the saw therein and enclosing the cutting area around the saw so as to prevent the saw dust and particles from entering the environment outside of the saw dust collection system; a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system;

and an air shutter member, the air shutter member configured to selectively open or close the internal vacuum port of the saw platform assembly so as to enable the vacuum source of the vacuum assembly to be used in two different modes of operation. In a first of the two modes of operation, the air shutter member is in an open position and the vacuum source of the vacuum assembly is configured to extract the saw dust and particles from inside the saw compartment. In a second of the two modes of operation, the air shutter member is in a closed position and the vacuum source of the vacuum assembly is configured to extract particulate matter from outside of the saw compartment.

In a further embodiment of the present invention, the vacuum source comprises a vacuum motor, and the vacuum assembly further comprises a first stage bag air filter and a second stage drum air filter. When the vacuum assembly is operating in the second mode of operation, the airflow stream with the particulate matter that is extracted from outside of the saw compartment bypasses the first stage bag air filter, and the airflow stream passes only through the second stage drum air filter, thereby allowing large particular matter to be collected in a collection chamber of the vacuum assembly, and small particular matter to be collected in a filter media of the second stage drum air filter.

In yet a further embodiment, the first stage bag air filter is in the form of an angular bag air filter that is removably attached to a top wall of the collection chamber of the vacuum assembly.

In still a further embodiment, the air shutter member is slidingly disposed in a slot in a peripheral sidewall of the saw platform assembly.

In yet a further embodiment, the saw dust collection system further comprises a dust collection pipe configured to extend from a location proximate to a blade of the saw to the internal vacuum port of saw platform assembly.

In still a further embodiment, at least one of the vacuum assembly and the saw platform assembly comprises a universal serial bus port for powering a portable digital device.

In yet a further embodiment, the first of the pair of workpiece insert slots is disposed in a first sidewall of the saw platform assembly, and the second of the pair of workpiece insert slots is disposed in a second sidewall of the saw platform assembly, the first sidewall of the saw platform assembly being disposed opposite to the second sidewall of the saw platform assembly.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF EMBODIMENTS OF THE INVENTION

Figure 1:
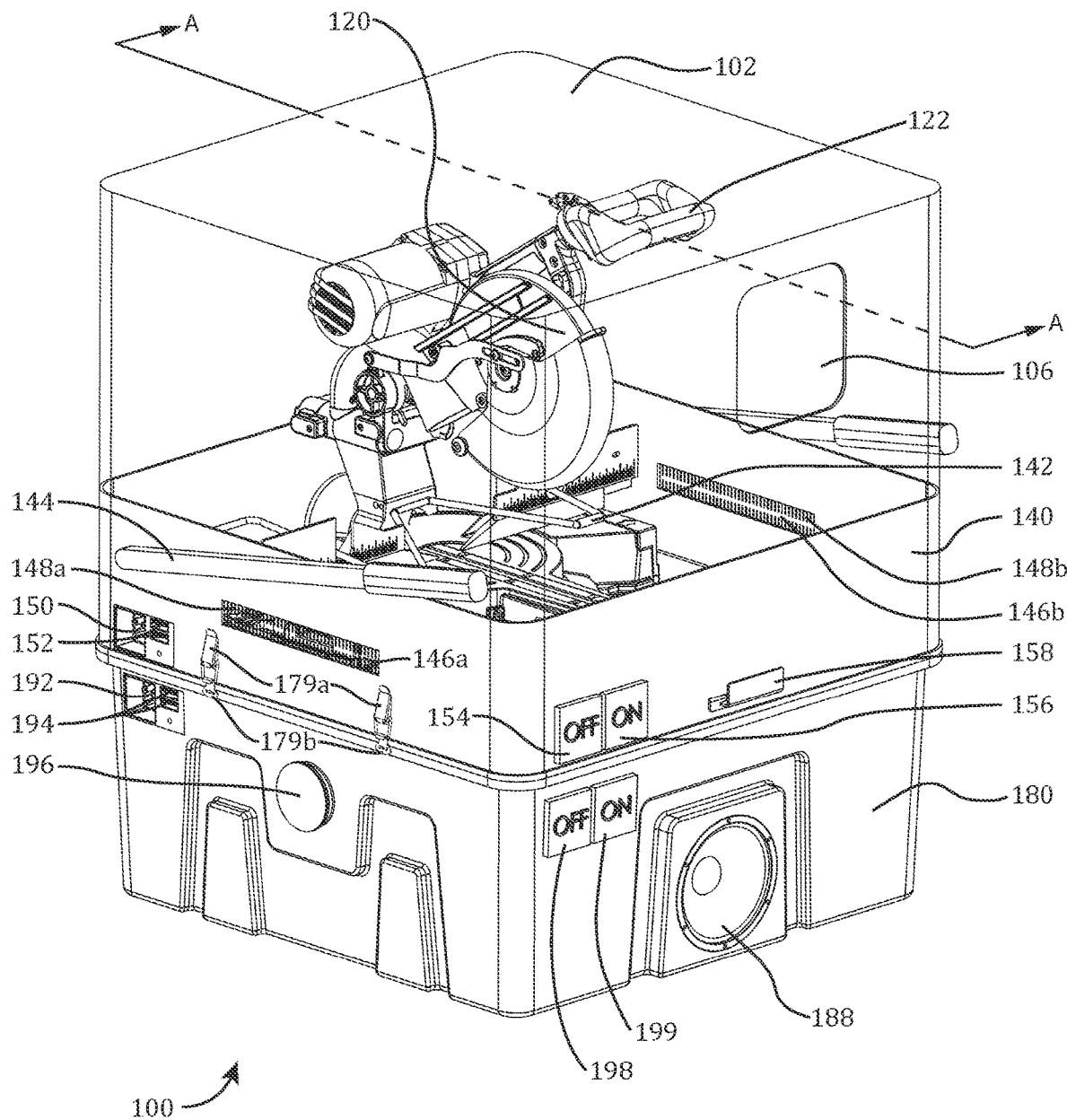
FIG. 1 is an assembled frontal perspective view of a saw dust collection system with a saw disposed therein, according to a first embodiment of the invention.
Figure 2:
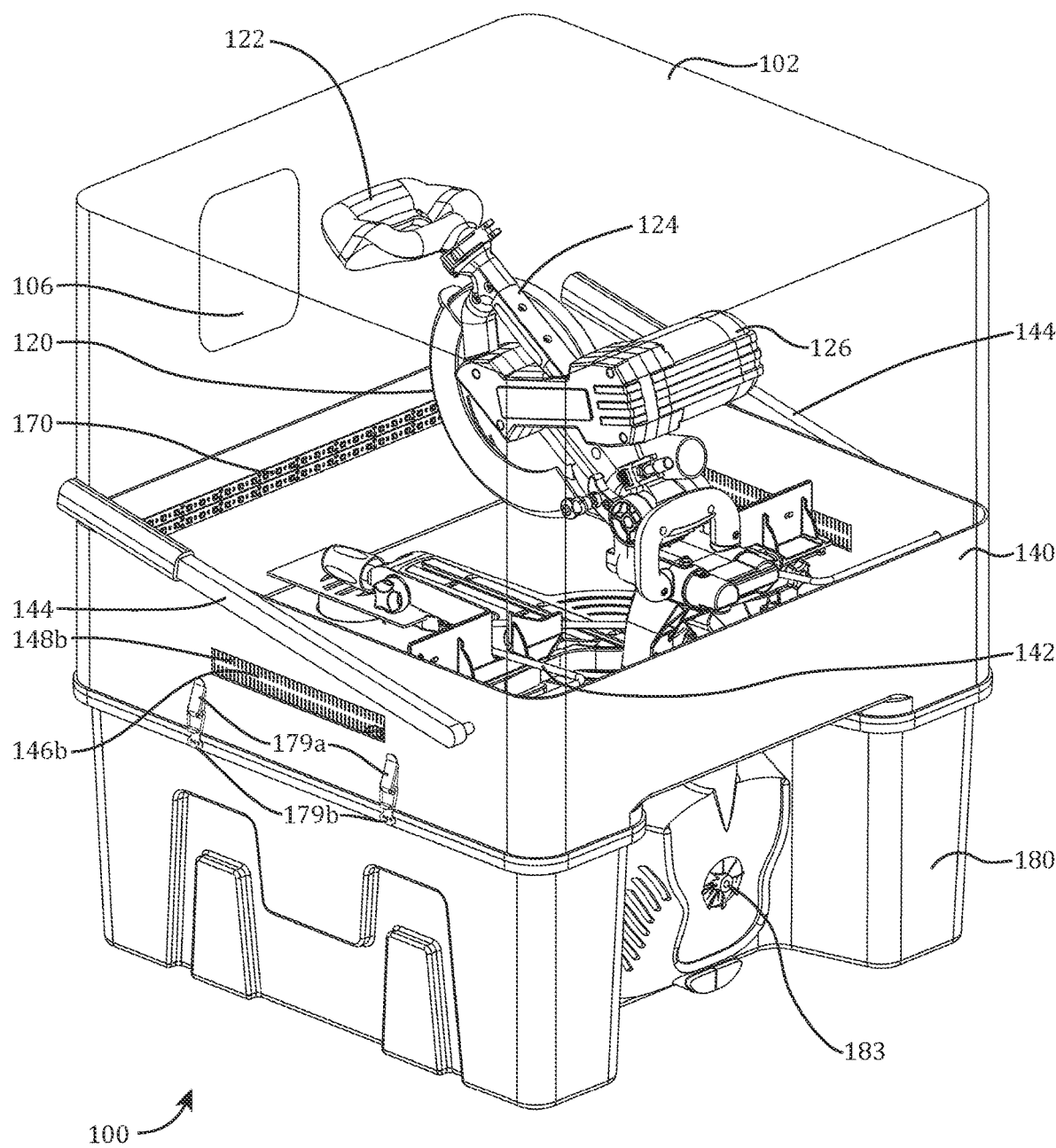
FIG. 2 is an assembled rear perspective view of the saw dust collection system and the saw of FIG. 1.
Figure 3:
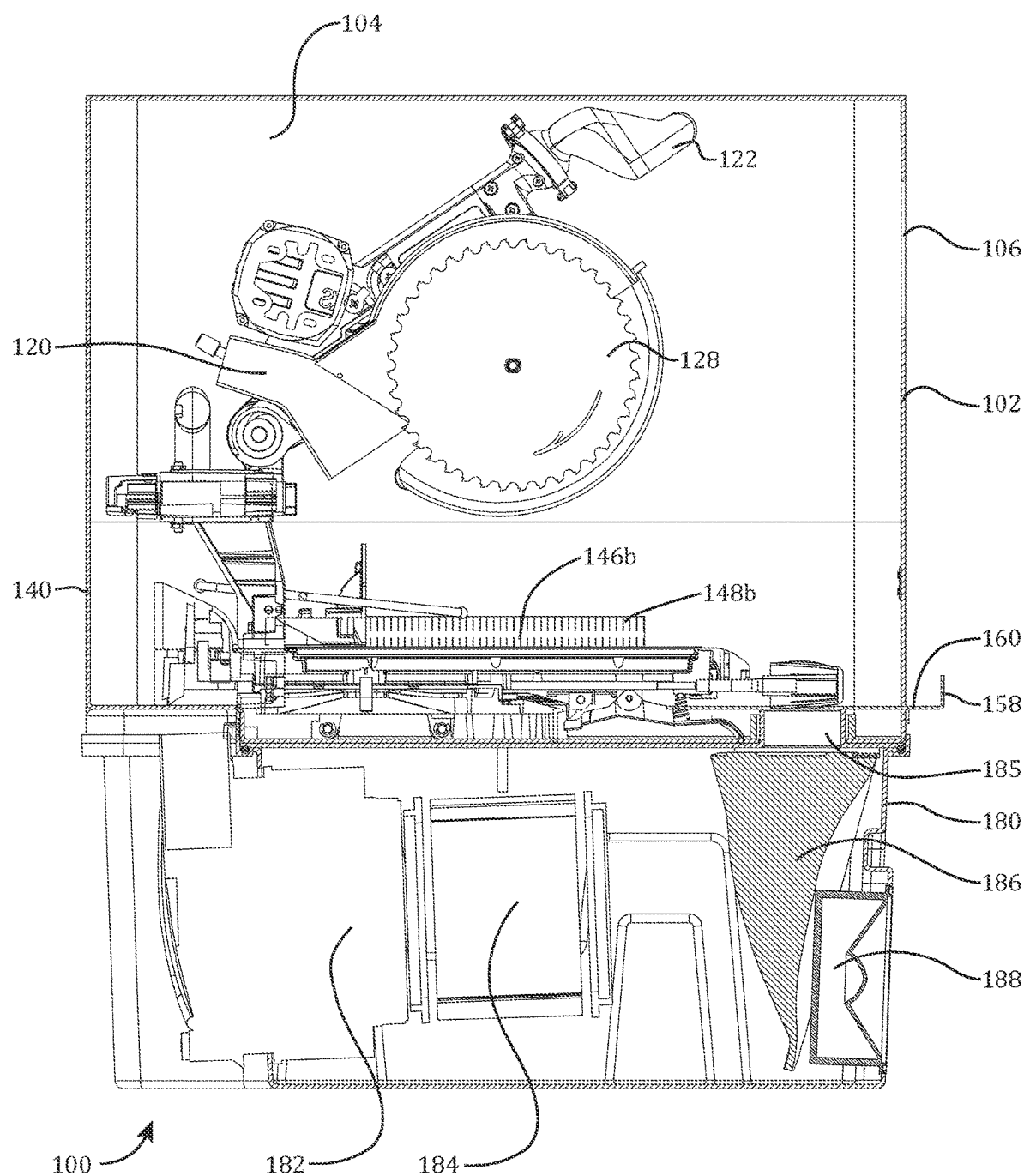
FIG. 3 is a sectional view of the saw dust collection system and the saw of FIG. 1, wherein the section is generally cut along the cutting-plane line A-A in FIG. 1.

A first illustrative embodiment of the saw dust collection system with a saw disposed therein is seen generally at 100 in FIGS. 1-3. As will be described in detail hereinafter, the saw dust collection system 100 is used for the containment of saw dust and particles generated by the cutting of a workpiece with the saw 120. In the first illustrative embodiment, referring initially to FIGS. 1 and 2, it can be seen that the saw dust collection system 100 generally comprises a vacuum assembly 180, the vacuum assembly 180 includes a vacuum source (e.g., with vacuum motor 182—see FIG. 3), the vacuum source 182 configured to create a vacuum for extracting the saw dust and particles from a cutting area surrounding the saw 120; a saw platform assembly 140 detachably coupled to the vacuum assembly 180, the saw platform assembly 140 comprising a floor 166 for supporting the saw 120 thereon (see FIG. 10), the saw platform assembly 140 further defining a vacuum port (e.g., air intake opening 174) fluidly coupled to the vacuum source 182; and a hood member 102 detachably coupled to the saw platform assembly 140, at least a portion of the hood member 102 being transparent so that a user of the saw is able to see through the hood member 102, the hood member 102 and the saw platform assembly 140 together defining a saw compartment 104 for containing the saw 120 therein and enclosing the cutting area around the saw 120 so as to prevent the saw dust and particles from entering the environment outside of the saw dust collection system 100. In addition to containing saw dust particles, the enclosed saw compartment 104 formed by the hood member 102 and the saw platform assembly 140 also prevents various types of bodily injuries to the user (i.e., hand injuries from sharp saw blades, eye injuries or other facial injuries from cut particles flying through the air, and inner ear injuries resulting from the saw noise) by shielding the user from the cutting area.

In the illustrative embodiment, the vacuum motor 182 of the vacuum assembly 180 may comprise a 5 horsepower (5 HP) or 6 horsepower (6 HP) motor. In one or more alternative embodiments, more than one vacuum motor may be used as the vacuum source of the vacuum assembly 180 (e.g., two motors operating in parallel or series).

Figure 4:
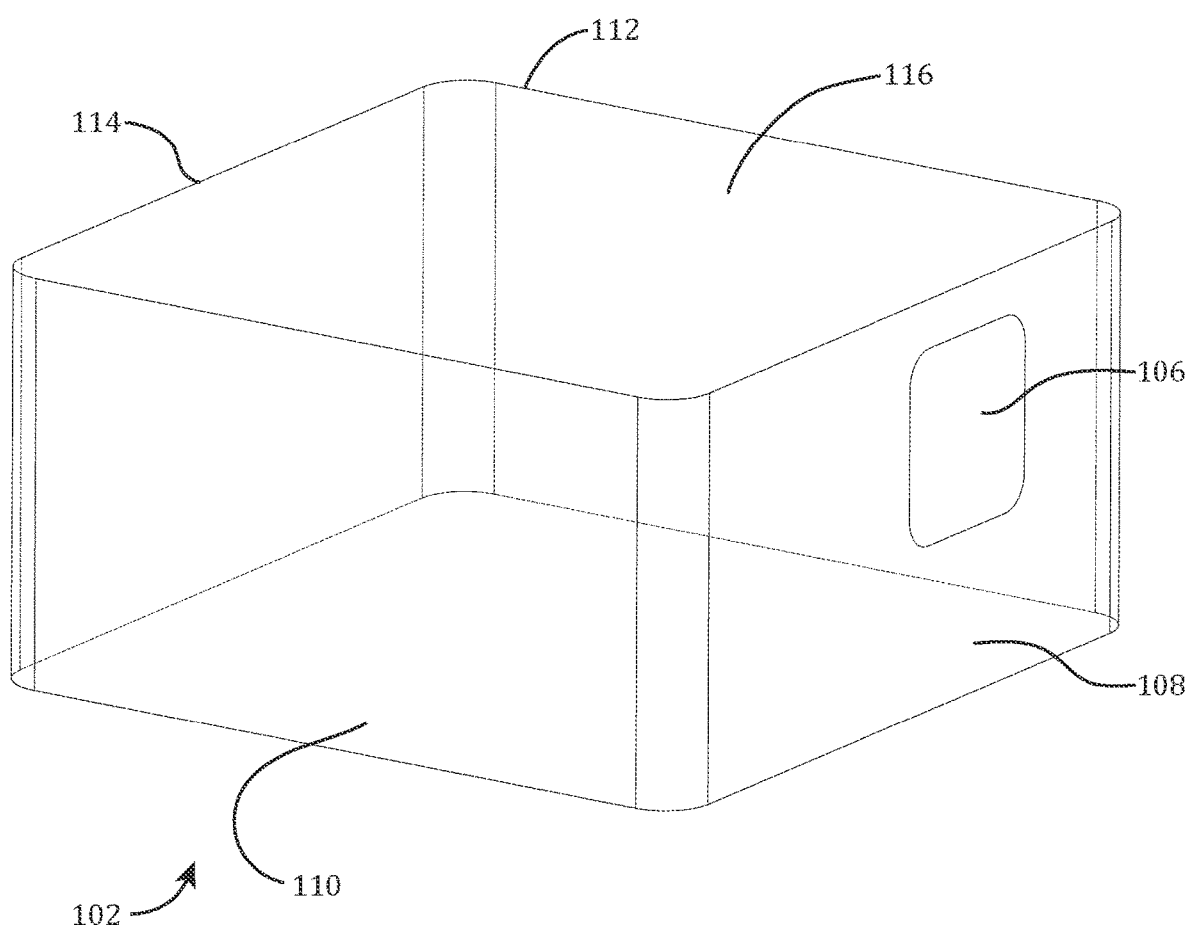
FIG. 4 is a perspective view of the hood member of the saw dust collection system of FIG. 1.

Now, with reference to FIGS. 1 and 4, the hood member 102 of the saw dust collection system 100 will be explained. As shown in FIG. 4, in the illustrative embodiment, the hood member 102 has a generally rectangular prism-like shape with a front wall panel 108, a first side panel 110, a second side panel 112 oppositely disposed relative to the first side panel 110, a rear wall panel 114 oppositely disposed relative to the front wall panel 108, and a top panel 116 connected to the top edges of the panels 108, 110, 112, 114. In FIG. 4, it can be seen that the hood member 102 further comprises a hand and arm port 106 disposed in the front wall panel 108 so as to allow the user to access the saw 120 disposed in the saw compartment 104 (see FIG. 3). During operation, when a user places his or her arm into the interior space 104 via the hand and arm port 106, the arm of the user acts to seal the hand and arm port 106. As shown in FIG. 4, in the illustrative embodiment, the hood member 102 is generally in the shape of a bottomless rectangular box with the panels 108, 110, 112, 114. The hood member 102 is removably attached to, and positioned onto the saw platform assembly 140 such that it encapsulates and seals the saw 120 together with the saw platform assembly 140, thereby forming an inner air tight interior cutting space 104 (see FIG. 3).

In the illustrative embodiment, the hood member 102 is made of a transparent material, such as a transparent polymeric material or plastic (e.g., polymethyl methacrylate (PMMA), otherwise known as Plexiglas®), which provides the user with an unobstructed view inside the hood member 102 into the interior space 104 at all times during operation. While the hood member 102 has a rectangular prism-like shape in the illustrative embodiment, it is to be understood that it can take on the form of many geometric shapes which cooperate with the saw platform assembly 140 so as to completely encapsulate and seal the saw 120, while providing adequate space for the operation thereof. Other envisioned shapes may include, but are not limited to, a dome shape, a frustoconical shape, a cylinder shape, or an elliptical shape.

In one or more embodiments, the peripheral bottom edge of the hood member 102 is provided with a gasket sealing member thereon so that the hood member 102 forms a substantially airtight connection with the saw platform assembly 140. In these one or more embodiments, the gasket sealing member may be formed from a compressible polymeric material or compressible rubber.

Figure 5:
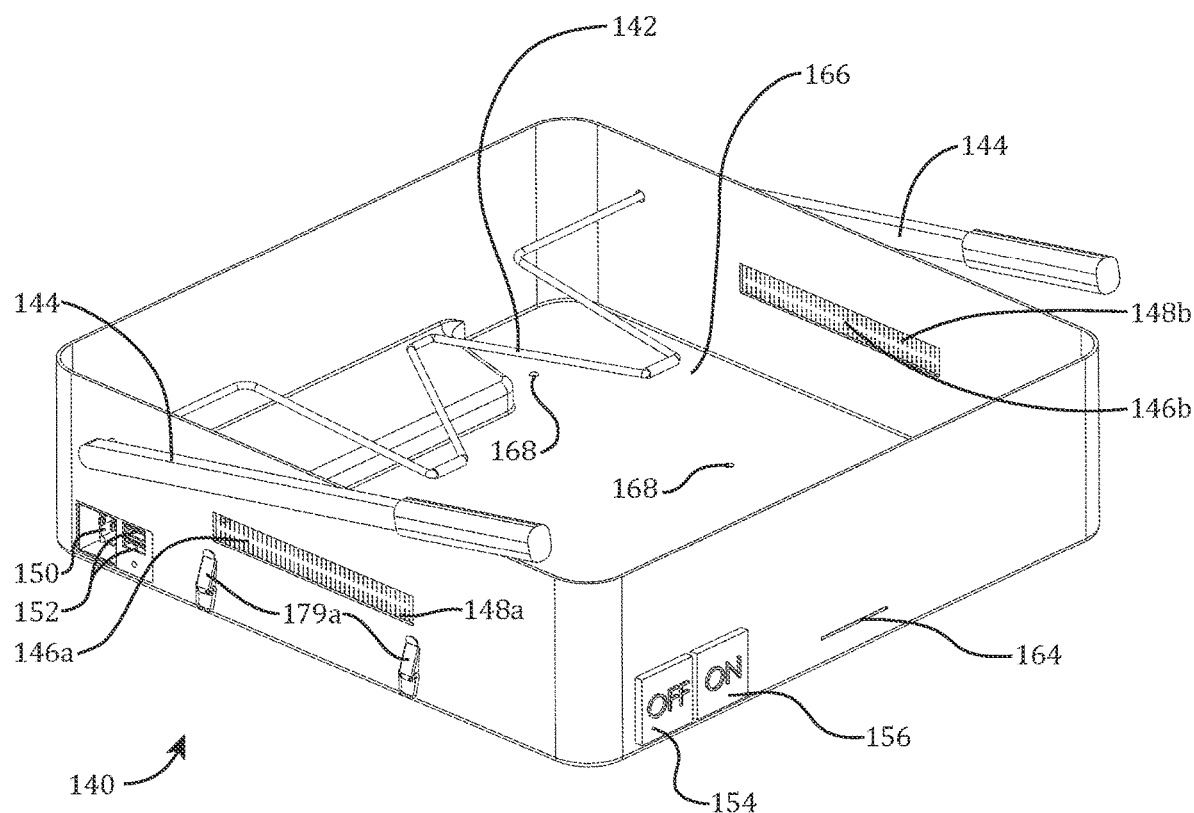
FIG. 5 is a perspective view of the saw platform assembly of the saw dust collection system of FIG. 1.
Figure 6:
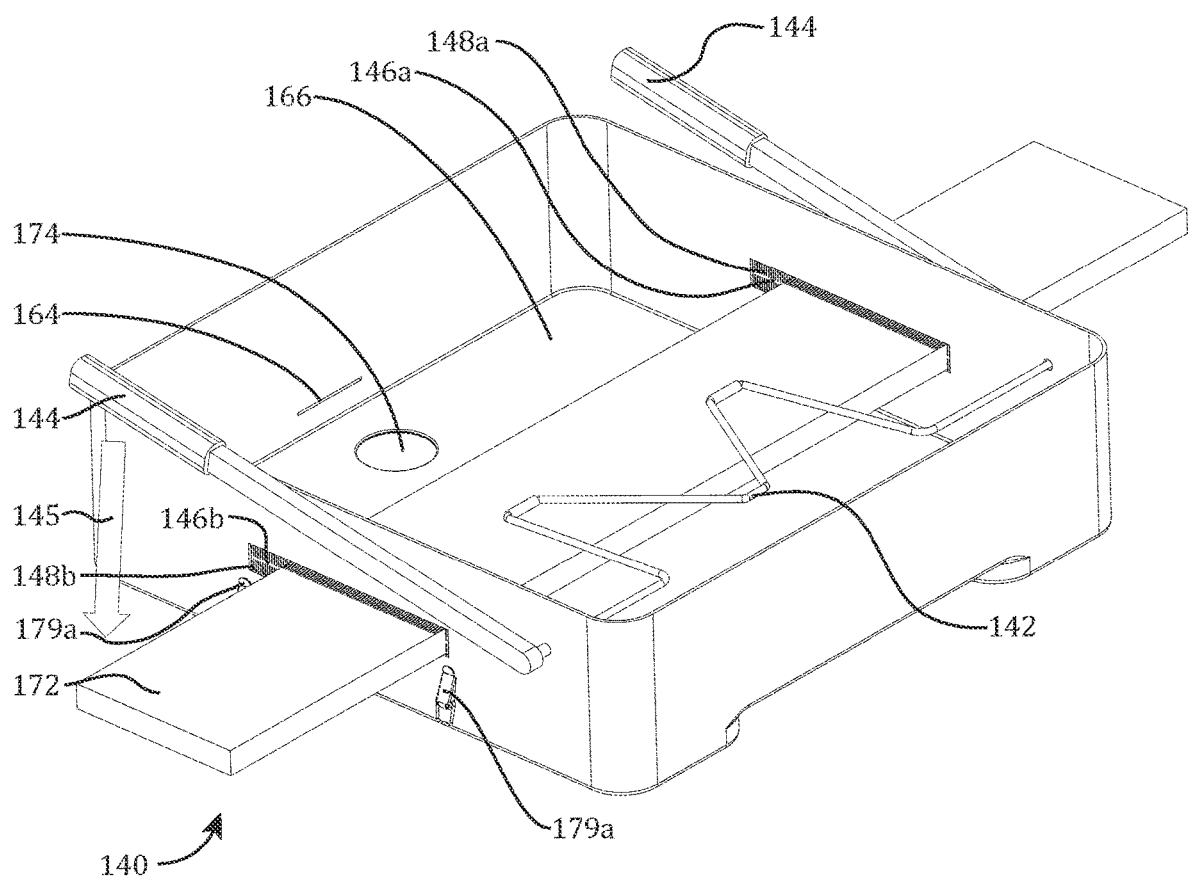
FIG. 6 is another perspective view of the saw platform assembly of the saw dust collection system of FIG. 1, wherein a workpiece is shown passing through the workpiece insert slots of the saw platform assembly.
Figure 10:
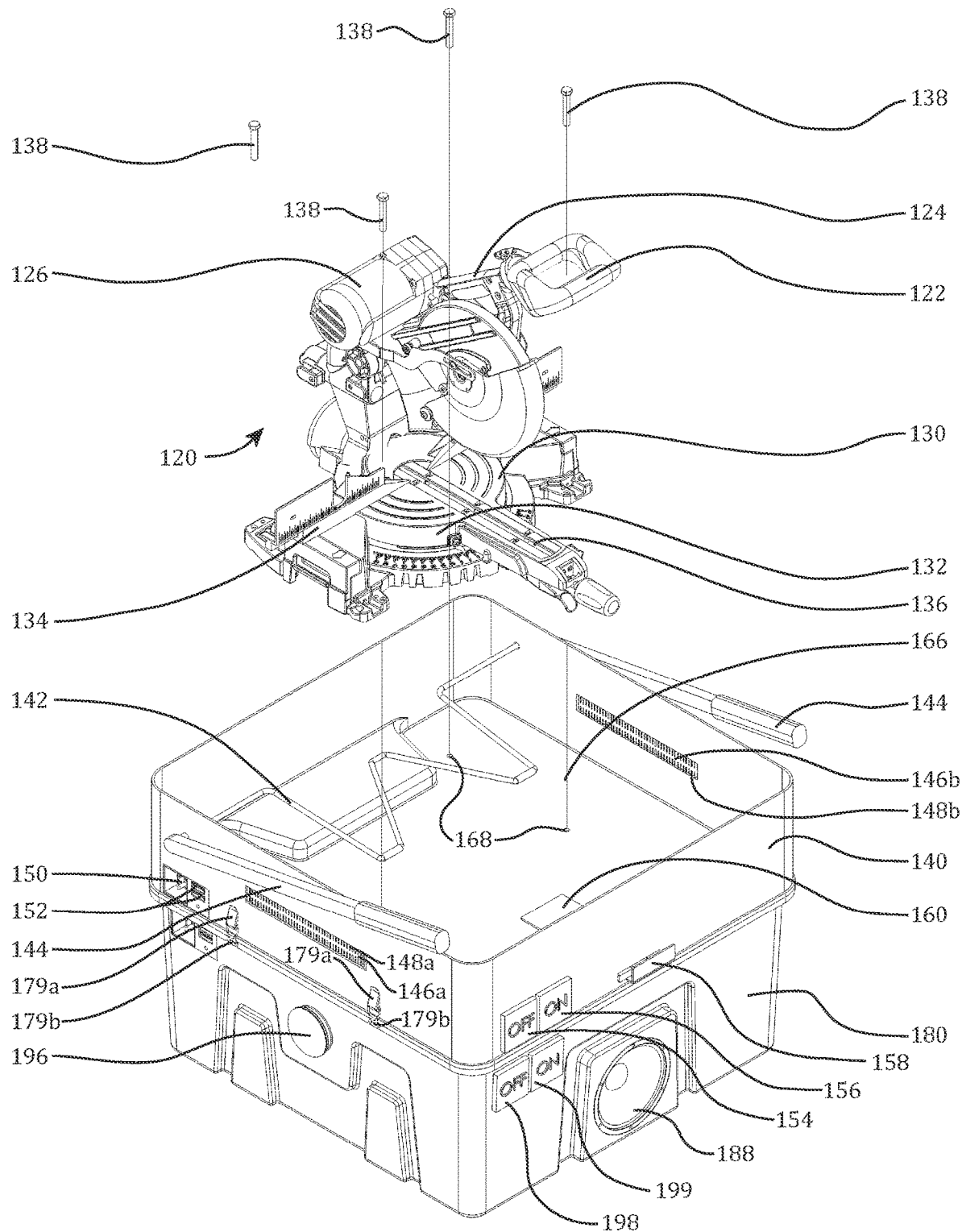
FIG. 10 is another perspective view of the saw dust collection system and the saw of FIG. 1, wherein the hood member has been removed from the saw dust collection system, and the manner in which the saw is attached to the saw platform assembly is illustrated.
Figure 11:
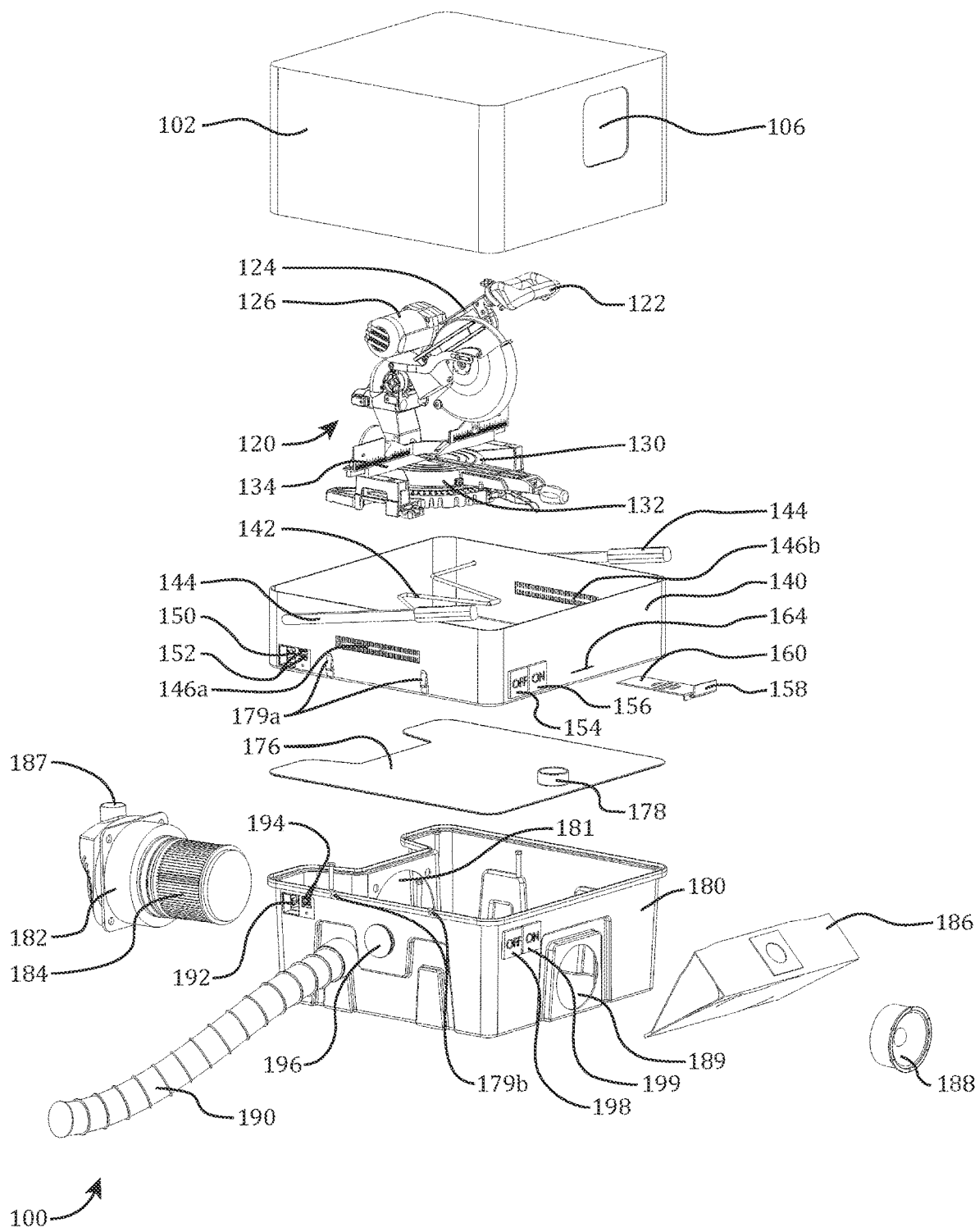
FIG. 11 is an exploded perspective view of the saw dust collection system and the saw of FIG. 1.

Next, turning to FIGS. 5-7B and 10, the saw platform assembly 140 of the illustrative saw dust collection system 100 will be described in detail. Initially, as shown in FIG. 10, it can be seen that the floor 166 of the saw platform assembly 140 is configured to accommodate the saw 120 mounted thereon. In particular, the platform floor 166 comprises a plurality of fastener apertures 168 (e.g., four (4) fastener apertures 168) disposed therein for receiving respective fasteners 138 (e.g., screws or bolts) for securing the saw 120 to the saw platform assembly 140. In the illustrative embodiment, the saw 120 is in the form of a miter saw used for carpentry work, particularly for wood working, flooring installation, cabinetry installation, molding work, and millwork. As shown in FIGS. 3, 10, and 11, the miter saw assembly comprises a cutting surface 130 having a turntable 132 and a fence 134, a pivoting arm 124, a saw blade 128 attached to the pivoting arm 124, a motor 126 which drives the saw blade 128, and a handle 122 for performing cuts of a workpiece 172 (see FIG. 6). As shown in FIG. 6, a typical workpiece 172 is an elongated wood plank or other material suitable for cutting and form fitting for purposes of molding, trim, and flooring. Examples include wood trim, wood and composite flooring, and molding. As is known in the art of woodworking, a miter saw is utilized to cut the workpiece 172 at predetermined lengths and angles in order to fit together with other workpieces (e.g., to form a custom wood floor of a dwelling). For example, the miter saw is capable of making a full cross-cut of the workpiece or full miter cross-cuts at angles of 15 degrees, 22.5 degrees, 30 degrees, 33⅓ degrees, or any angle between 45 degrees and 90 degrees.

In one or more alternative embodiments, the air intake grille of the motor 126 of the miter saw 120 may be fluidly coupled to one or more flexible ducts that extend from the air intake grille of the motor 126 to an air intake opening in one side of the hood member 102. That way, the cooling air for the saw motor 126 may be extracted directly from the ambient environment outside of the saw compartment 104 so as to deliver cooler air to the motor 126. Also, the ducting of the cooling air for the motor 126 also advantageously prevents the dust-laden air present in the saw compartment 104 from being drawn into the interior of the motor 126, thereby preventing particulate build-up inside the motor 126. In these one or more embodiments, the air intake duct(s) for the saw motor 126 is flexible so as to allow the pivoting arm 124 of the saw 120 to be raised and lowered using the handle 122.

Figure 7A:
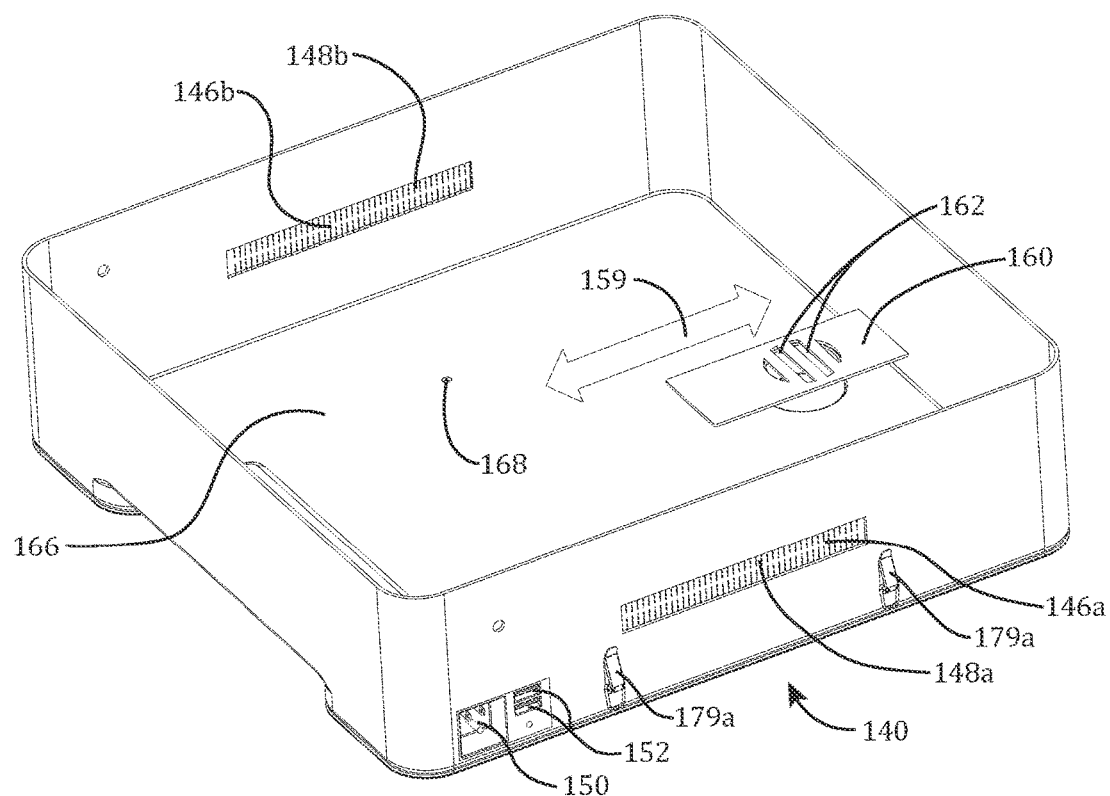
FIG. 7A is yet another perspective view of the saw platform assembly of the saw dust collection system of FIG. 1, wherein the slidable operation of the air shutter member is illustrated.
Figure 7B:
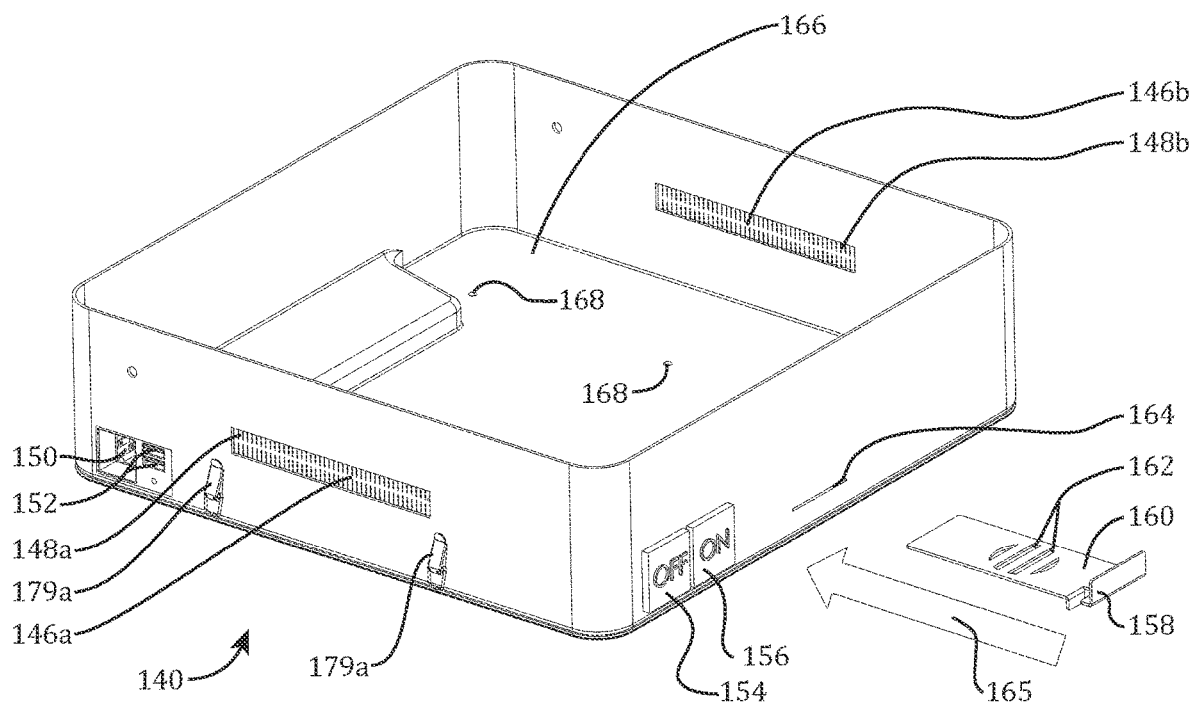
FIG. 7B is yet another perspective view of the saw platform assembly of the saw dust collection system of FIG. 1, wherein the manner in which the air shutter member is inserted into the air shutter slot of the saw platform assembly is illustrated.
Figure 8:
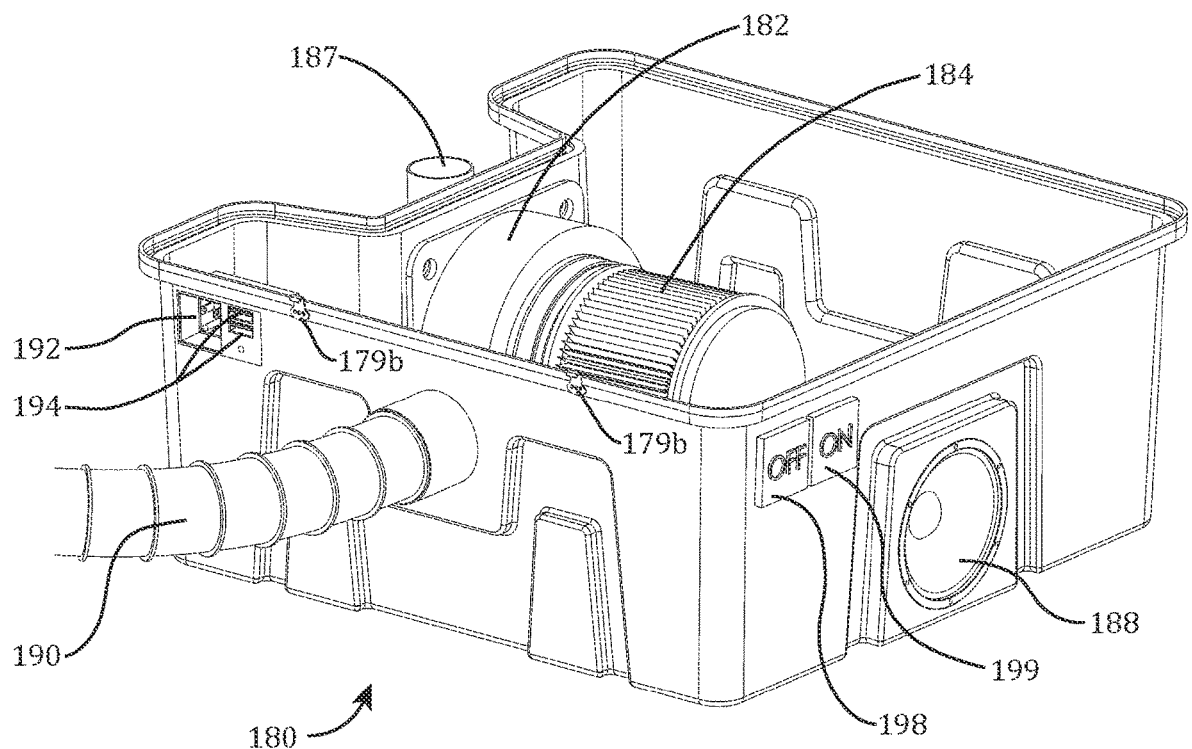
FIG. 8 is a perspective view of the vacuum assembly of the saw dust collection system of FIG. 1.
Figure 9:
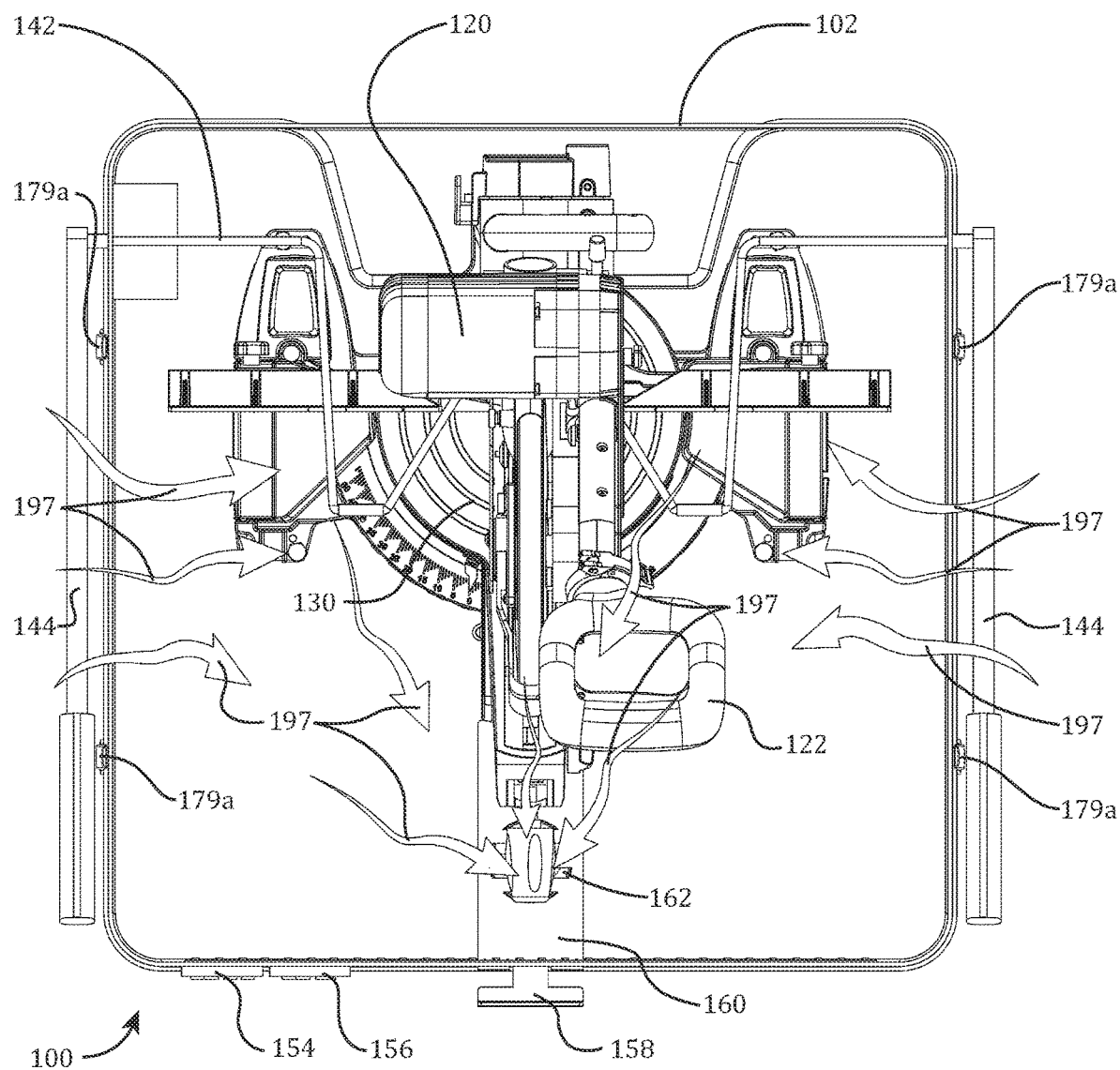
FIG. 9 is a top plan view of the saw dust collection system and the saw of FIG. 1, which illustrates the airflow through the saw dust collection system.

As shown in FIG. 10, the saw assembly 120 is positioned centrally and directly on the floor 166 of the saw platform assembly 140 so that the blade slot 136 (where most of the saw dust is directed during operation) is disposed proximate to the vacuum port (e.g., air intake opening 174) provided in the floor 166 of the saw platform assembly 140 (see FIGS. 3 and 6). As best shown in FIGS. 7A and 7B, the saw platform assembly 140 further comprises an air shutter member 160 configured to selectively open or close the internal vacuum port of the saw platform assembly 140 (as shown diagrammatically by the displacement directional arrow 159 in FIG. 7A) so as to enable the vacuum source 182 of the vacuum assembly 180 to be used in two different modes of operation, as will be described hereinafter. As shown in FIG. 7A, when the air openings 162 in the air shutter member 160 are aligned with the vacuum port in the floor 166 of the saw platform assembly 140, airflow is permitted through the vacuum port so as to extract saw dust and debris from the saw compartment 104. Conversely, when the vacuum port in the floor 166 of the saw platform assembly 140 is covered solely by the solid portion of the air shutter member 160, airflow is prevented through the vacuum port so that the vacuum assembly 180 is able to be used as a shop-vac for removing debris outside of the saw dust collection system 100, as will be described in further detail hereinafter. As shown in FIG. 7B, the air shutter member 160 is slidingly disposed in a slot 164 in a front sidewall of the saw platform assembly 140 (as indicated diagrammatically by the directional arrow 165 in FIG. 7B). A user adjusts the position of the air shutter member 160 (as opened or closed) by grasping and pulling or pushing on the upstanding handle 158 of the air shutter member 160.

With reference to FIGS. 1, 7A, and 7B, it can be seen that, in the illustrative embodiment, the saw platform assembly 140 further comprises a pair of workpiece insert slots 146*a*, 146*b*. A first 146*a* of the pair of workpiece insert slots 146*a*, 146*b* is oppositely disposed relative to a second 146*b* of the pair of workpiece insert slots 146*a*, 146*b* (i.e., the first workpiece insert slot 146*a* is disposed in a first sidewall of the saw platform assembly 140, which is opposite to a second sidewall of the saw platform assembly 140 in which the second workpiece insert slot 146*b* is disposed—see FIGS. 7A and 7B). As shown in FIG. 6, the workpiece insert slots 146*a*, 146*b* are configured so as to allow a workpiece 172 to extend through the opposite sidewalls of the saw platform assembly 140 of the saw dust collection system 100. As shown in the illustrative embodiment of FIGS. 6, 7A, and 7B, each of the workpiece insert slots 146*a*, 146*b* has a width larger than the height thereof so as to form an elongate slot. Each workpiece insert slot 146*a*, 146*b* mirrors and is positioned opposite the other and is generally shaped to receive a workpiece 172 having a thin rectangular cross section (see FIG. 6). In the illustrative embodiment, the workpiece insert slots 146*a*, 146*b* are elevated at a height from the floor of the saw platform assembly 140 that is sufficient to place an inserted workpiece 172 parallel and level with the cutting surface 130 of the saw 120. Moreover, in the illustrative embodiment, the workpiece insert slots 146*a*, 146*b* may further comprise respective flexible sealing members 148*a*, 148*b* (e.g., brush grommet members 148*a*, 148*b*), which operate to open and close the workpiece insert slots 146*a*, 146*b* during operation. The flexible sealing members 148*a*, 148*b* prevent saw dust and particles from entering the environment outside of the saw dust collection system 100. Thus, while inserting a workpiece 172, the flexible sealing members 148*a*, 148*b* move apart to allow ingress and egress of the workpiece 172 into the interior cutting space 104, while simultaneously providing a seal around the workpiece 172. In an alternative embodiment, the flexible sealing members 148*a*, 148*b* may be in form of flexible flap members, rather than the brush grommet members 148*a*, 148*b* shown in the illustrative embodiment.

Now, referring again to FIGS. 1, 5, and 6, it can be seen that, in the illustrative embodiment, the saw platform assembly 140 further comprises a workpiece hold-down subassembly 142, 144 configured to enable the user to hold the workpiece 172 in place while the workpiece is being cut by the saw 120 (see FIG. 6). As best shown in FIGS. 5 and 6, the workpiece hold-down subassembly 142, 144 comprises a workpiece hold-down bar 142 attached to a pair of handle members 144 disposed on opposite exterior sides of the saw platform assembly 140. During a cutting operation when cutting precision is needed, the workpiece 172 is placed through the workpiece insert slots 146*a*, 146*b* under the saw cutting blade 128. Then, the handle members 144 are lowered (as shown diagrammatically by the directional arrow 145 in FIG. 6), and the workpiece hold-down bar 142 holds the workpiece 172 stable for an accurate cut by the saw 120. The workpiece hold-down subassembly 142, 144 is not used during the cutting of all workpieces, but rather is only used when accuracy is needed (e.g., miter cuts of a quartered round).

Figure 23:
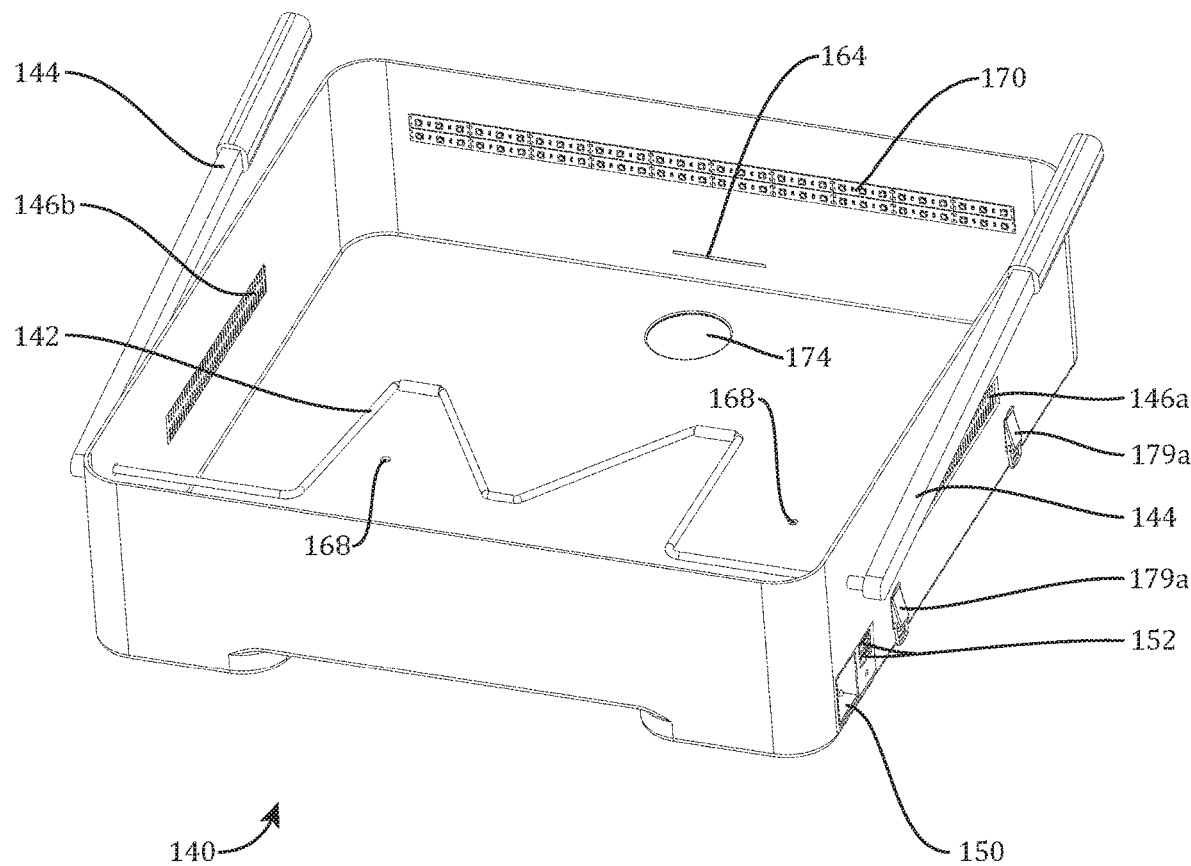
FIG. 23 is another perspective view of the saw platform assembly of the saw dust collection system of FIG. 1, wherein the light emitting devices inside the saw platform assembly are illustrated.

As shown in FIGS. 2 and 23, in the illustrative embodiment, the saw platform assembly 140 further comprises a plurality of light emitting devices 170 for illuminating the saw compartment 104 containing the saw 120. In FIGS. 2 and 23, it can be seen that the light emitting devices 170 may be provided on the inner surface of the front wall of the saw platform assembly 140 for illuminating the saw compartment 104. Advantageously, the light emitting devices 170 facilitate more accurate cuts by the user by enhancing the visibility within the saw compartment 104. In the illustrative embodiment, the plurality of light emitting devices 170 are in the form of a plurality light-emitting diode (LED) lights (i.e., LED light strips).

In the illustrative embodiment, referring again to FIGS. 1 and 5, it can be seen that the saw platform assembly 140 further comprises an electrical connector 150 (i.e., an electrical receptacle for receiving the end of an electrical power cord) for providing power to the saw 120 and the light emitting devices 170. Also, as shown in these figures, the saw platform assembly 140 additionally comprises a power deactivation button 154 (i.e., "OFF" button) and a power activation button 156 (i.e., "ON" button) for deactivating and activating the saw 120 and the light emitting devices 170. As will be explained in more detail hereinafter, the vacuum assembly 180 is provided with a separate electrical connector 192 and separate power buttons 198, 199 for the vacuum source 182 so as to enable the vacuum source 182 and the saw 120 to be powered from different electrical receptacles of a residential or commercial building. Typically, residential electric outlets are designed for a maximum current load of 15 amperes (15 A). The electric motor of a typical miter saw draws 15 amperes of current, so the use of a power supply from one electric outlet would overload the circuit breaker associated with that electric outlet if the entire unit (i.e., the miter saw and vacuum motor) were fed from a single 15A electrical outlet.

In one or more alternative embodiments, rather than being activated and deactivated by the power buttons 154, 156, the light emitting devices 170 may have dedicated power button (s) so as to enable the lights 170 to be left on even when the saw 120 is not running.

In addition, as shown in the illustrative embodiment of FIGS. 1 and 5, the saw platform assembly 140 may further comprise a plurality of Universal Serial Bus (USB) ports 152 (e.g., two (2) USB ports 152) for powering portable digital devices (a smartphone, a digital music player, etc.). For example, a user could power or charge his or her smartphone using one of the USB ports 152.

Now, with reference to FIGS. 1-3, 8, 9, and 11, the vacuum assembly 180 of the illustrative saw dust collection system 100 will be explained. Initially, referring to FIGS. 8 and 11, it can be seen that vacuum assembly 180 comprises a box-like housing portion with a plurality of upstanding walls and a removable top wall portion 176 that is configured to engage with the top rim of the box-like housing portion so as to form a sealed vacuum chamber, which contains the internal components 182, 184, 186 of the vacuum assembly 180 (see FIG. 3). In the illustrative embodiment, as shown in FIGS. 3 and 11, the vacuum source 182 comprises a vacuum motor and impeller subassembly that is received within an opening 181 in the rear wall of the box-like housing portion of the vacuum assembly 180. Also, as depicted in FIGS. 3 and 11, the vacuum assembly 180 further comprises a first stage bag air filter 186 and a second stage drum air filter 184. The first stage bag air filter 186 is in the form of an angular bag air filter that is removably attached to the top wall 176 of the vacuum chamber of the vacuum assembly 180 (e.g., by means of a top plate on the angular bag air filter 186 sliding into a raised track on the bottom of the top wall 176 of the vacuum chamber, the engagement between the angular bag air filter 186 and the top wall 176 of the vacuum chamber is diagrammatically represented in FIGS. 26A and 26B by arrows 272). The first stage bag air filter 186 initially removes the larger saw dust and particles generated by the cutting of a workpiece with the saw 120, and is able to be easily changed by a user once the filter becomes fully loaded with particulate matter. The second stage drum air filter 184 removes the smaller particulate matter that is not removed from the air stream by the first stage bag air filter 186. After the particulate matter is removed from the air stream by the second stage drum air filter 184, the clean air is discharged to the ambient environment outside the saw dust collection system 100 through the vacuum motor discharge pipe 187 illustrated in FIG. 11. As shown in FIG. 2, the back of the vacuum source 182 is provided with an air intake port 183 for extracting cooling air from the ambient environment that is used to cool the vacuum motor.

In the illustrative embodiment, the bottom surface of the box-like housing portion of the vacuum assembly 180 may be provided with a rubber non-slip layer thereon in order to prevent the slippage of the saw dust collection system 100 during the performance of cutting operations.

Figure 26A:
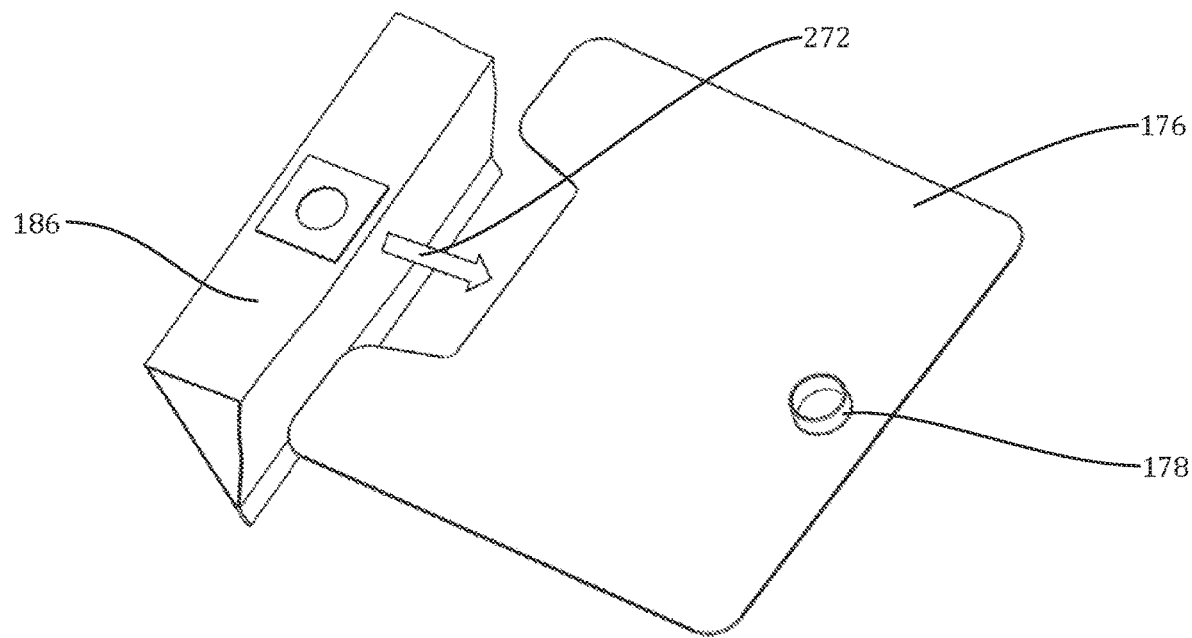
FIG. 26A is a top perspective view of the angular air filter and the top wall of the vacuum assembly of the saw dust collection systems of FIGS. 1 and 12, wherein the attachment of the angular air filter to the top wall of the vacuum assembly is illustrated.
Figure 26B:
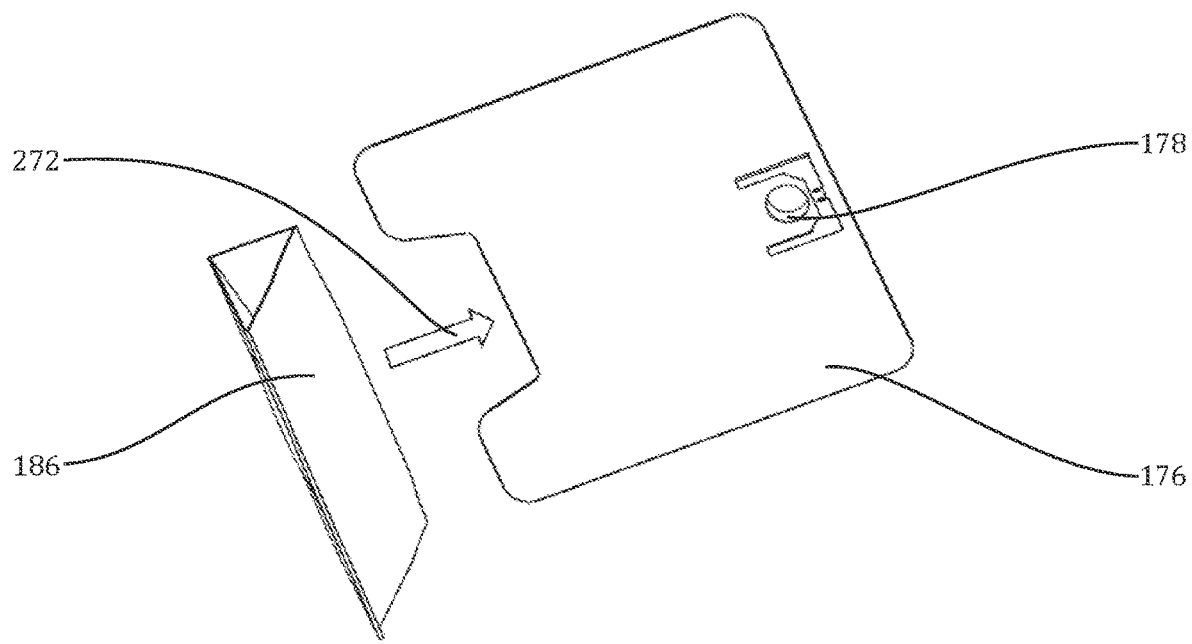
FIG. 26B is a bottom perspective view of the angular air filter and the top wall of the vacuum assembly of the saw dust collection systems of FIGS. 1 and 12, wherein the attachment of the angular air filter to the top wall of the vacuum assembly is illustrated.

As shown in FIGS. 11 and 26A, the upper surface of the top wall 176 of the vacuum chamber of the vacuum assembly 180 comprises an upstanding air intake collar 178 that is received through the vacuum port (e.g., air intake opening 174) provided in the floor 166 of the saw platform assembly 140. In the sectional view of FIG. 3, it can be seen that the upstanding air intake collar 178 forms an air intake pipe 185 for fluidly connecting the saw platform assembly 140 to the vacuum chamber of the vacuum assembly 180. As also shown in FIG. 11, the one side wall of the box-like housing portion of the vacuum assembly 180 is provided with a capped external vacuum port 196 for receiving the end of the vacuum hose 190 for removing debris from outside of the saw dust collection system 100 in the second mode of operation, as will be described hereinafter.

Figure 24:
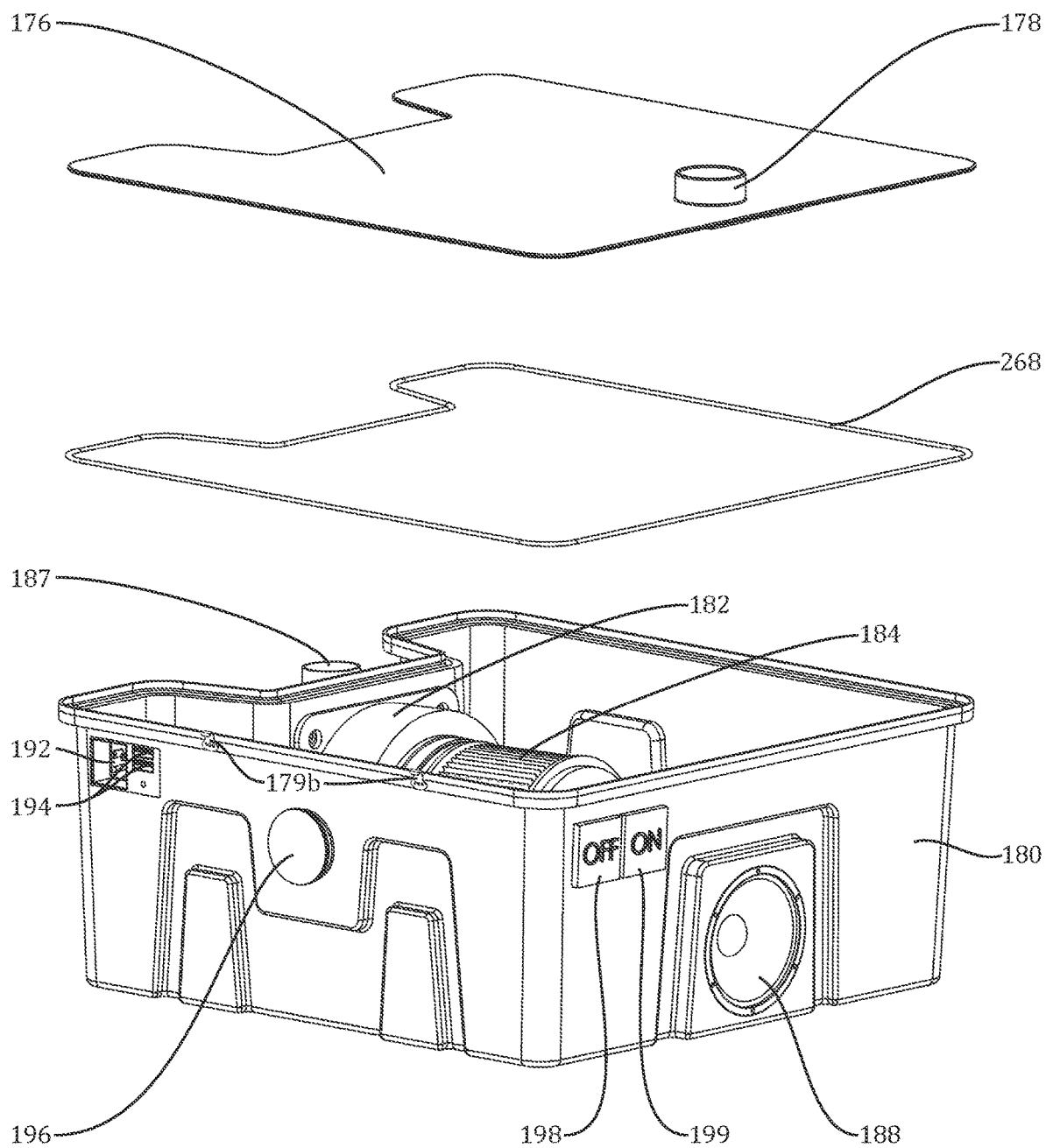
FIG. 24 is a partially exploded perspective view of the vacuum assembly of the saw dust collection systems of FIGS. 1 and 12, wherein the top wall of the vacuum chamber and the peripheral sealing member are shown exploded from the remainder of the vacuum assembly.
Figure 25:
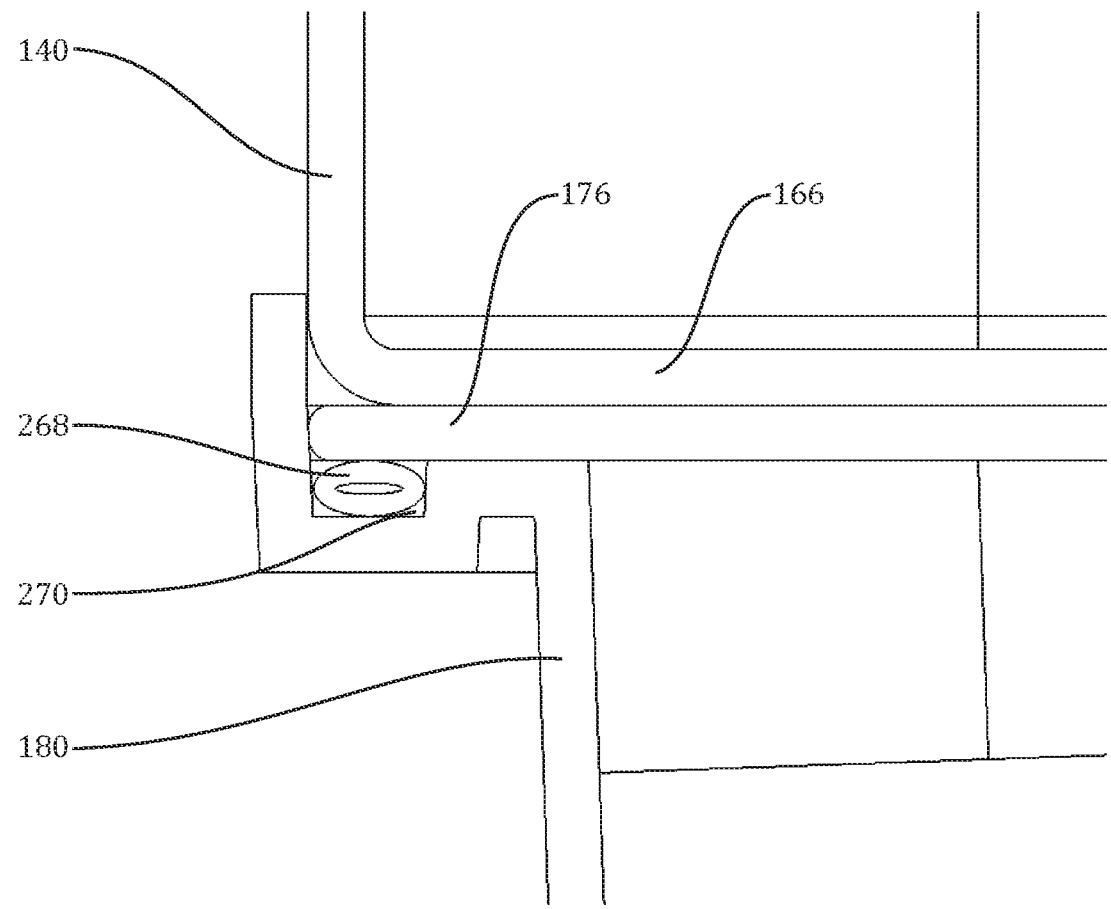
FIG. 25 is a partial sectional view of the saw platform assembly and the vacuum assembly illustrating the peripheral sealing member disposed between the vacuum assembly and the saw platform assembly.

The manner in which the top wall 176 of the vacuum chamber of the vacuum assembly 180 is attached to the box-like housing portion is illustrated in FIGS. 24 and 25. As shown in these figures, the top periphery of the box-like housing portion of the vacuum assembly 180 comprises a peripheral rim or lip that defines a groove 270 for receiving the peripheral gasket member 268 therein. As best shown in the sectional detail view of FIG. 25, the peripheral gasket member 268 is compressed between the bottom surface of the vacuum chamber top wall 176 and the floor of the groove 270 so as to form a generally airtight connection between the top wall 176 of the vacuum assembly 180 and the upstanding walls of the vacuum chamber box-like housing. As such, as a result of the gasket sealing member 268, there is insignificant air leakage between the top wall 176 and the upstanding walls of the vacuum chamber box-like housing. In the illustrative embodiment, the gasket sealing member 268 may be formed from a compressible polymeric material or compressible rubber.

With combined reference to the illustrative embodiment of FIGS. 1, 3, 8, 11 and 21, it can be seen that the front wall of the box-like housing portion of the vacuum assembly 180 further comprises a speaker 188 for playing music at the jobsite of the user. As shown in the exploded view of FIG. 11, the front wall of the box-like housing portion of the vacuum assembly 180 has an aperture 189 formed therein for receiving the speaker 188. In the illustrative embodiment, the speaker 188 is operatively coupled to a portable digital device of the user by means of a wireless personal area network (e.g., a Bluetooth® network).

In the illustrative embodiment, referring again to FIGS. 1, 8, and 11, it can be seen that the vacuum assembly 180 further comprises an electrical connector 192 (i.e., an electrical receptacle for receiving the end of an electrical power cord) for providing power to the vacuum motor 182 and the speaker 188. Also, as shown in these figures, the vacuum assembly 180 additionally comprises a power deactivation button 198 (i.e., "OFF" button) and a power activation button 199 (i.e., "ON" button) for deactivating and activating the vacuum motor 182 and the speaker 188. As explained above, the saw 120 and the light emitting devices 170 are provided with the separate electrical connector 150 and separate power buttons 154, 156 for the saw 120 so as to enable the vacuum source 182 and the saw 120 to be powered from different electrical receptacles of a residential or commercial building so as to not overload the circuit breaker of a single 15A electrical outlet.

In addition, similar to that described above for the saw platform assembly 140, in the illustrative embodiment, the vacuum assembly 180 may further comprise a plurality of Universal Serial Bus (USB) ports 194 (e.g., two (2) USB ports 194) for powering portable digital devices (a smartphone, a digital music player, etc.). For example, a user could power or charge his or her smartphone using one of the USB ports 194.

Figure 12:
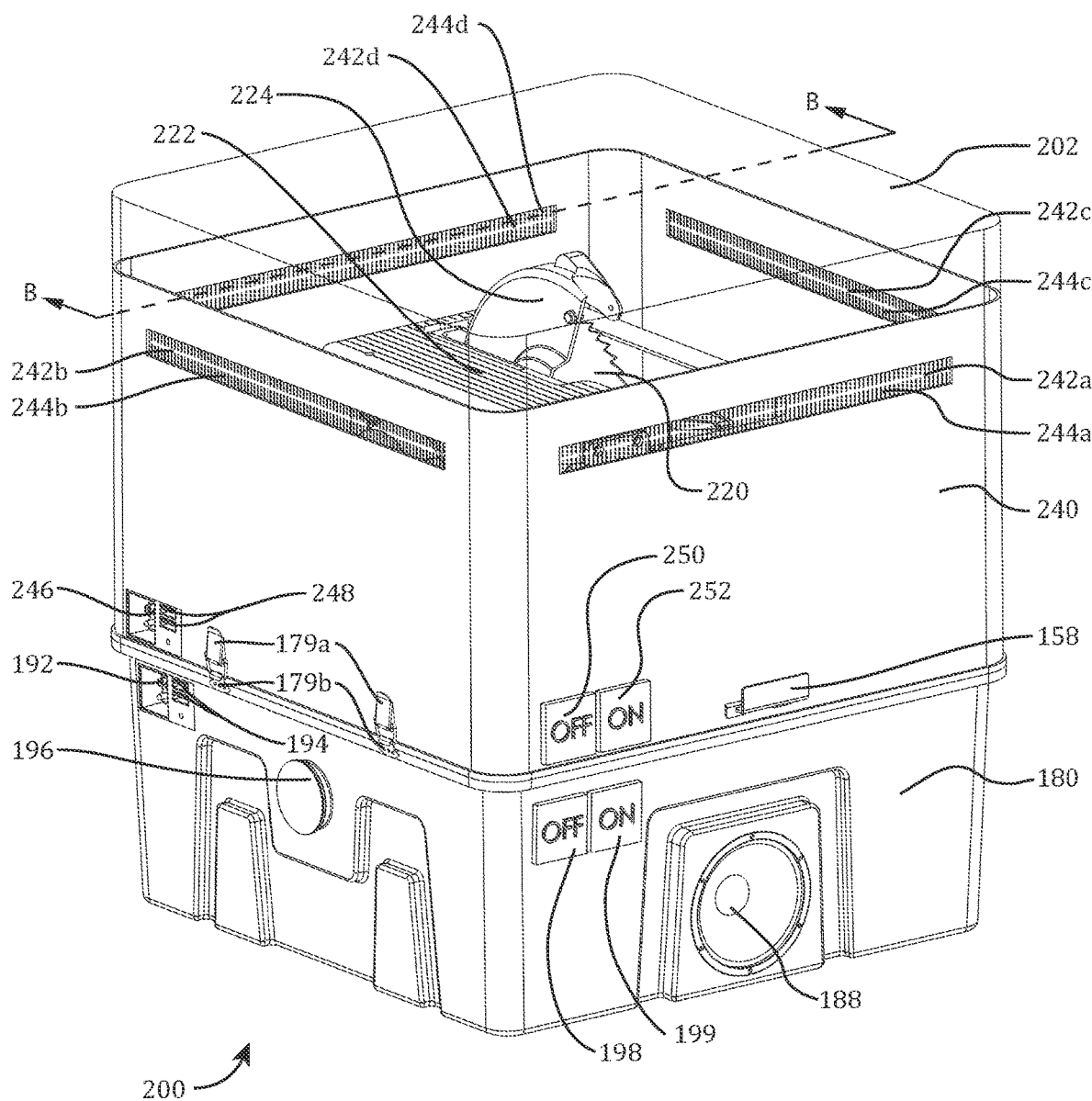
FIG. 12 is an assembled frontal perspective view of a saw dust collection system with a saw disposed therein, according to a second embodiment of the invention.

In the illustrative embodiment, the vacuum assembly 180 of the saw dust collection system 100 is configured to be interchangeably used with a plurality of different saw platform assemblies 140 containing different types of saws therein (e.g., one saw platform assembly 140 with a miter saw and another saw platform assembly 240 with a mini table saw—see FIG. 12). Advantageously, the interchangeability of the vacuum assembly 180 enables the user to selectively attach the vacuum assembly 180 to a selected one of the saw platform assemblies 140, 240 that is being used at the jobsite at a particular time. As shown in FIGS. 1, 2, 10, 11, and 22, to enable the vacuum assembly 180 to be easily used with a plurality of different saw platform assemblies, the saw platform assembly 140 further comprises a plurality of first latch portions 179*a* and the vacuum assembly 180 further comprises a plurality of second latch portions 179*b*. Advantageously, a user can easily attach the vacuum assembly 180 to a particular saw platform assembly 140 by engaging the loop of each first latch portion 179*a* on the saw platform assembly 140 with the hook on each respective second latch portion 179*b* on the vacuum assembly 180 (as indicated diagrammatically by the directional arrow 266 in FIG. 22). As such, by connecting respective ones of the first latch portions 179*a* with respective ones of the second latch portions 179*b*, the saw platform assembly 140 is able to be detachably coupled to the vacuum assembly 180 without the use of tools. The saw platform assembly 240 of the second embodiment also contains first latch portions 179*a* for engaging with the second latch portions 179*b* of the vacuum assembly 180 (see FIGS. 12 and 16).

Also, because the hood member 102 is detachably coupled to the saw platform assembly 140, and the saw platform assembly 140 is detachably coupled to the vacuum assembly 180, each of these sections of the saw dust collection system 100 may be detached from one another so that the sections 102, 140, 180 may be separately carried by the user to a jobsite so that a single cumbersome device is not required to be carried by the user. Then, the hood member 102, the saw platform assembly 140, and the vacuum assembly 180 may be assembled at the jobsite prior to the user performing cutting operations with the saw 120.

Now, with reference to FIGS. 7A, 7B, 8, and 11, the two modes of operation of the saw dust collection system 100 will be explained. In a first of the two modes of operation, the air shutter member 160 is in an open position (FIG. 7A position), and the vacuum source 182 of the vacuum assembly 180 is configured to extract the saw dust and particles from inside the saw compartment 104. In a second of the two modes of operation, the air shutter member 160 is in a closed position (in which the vacuum port in the floor 166 of the saw platform assembly 140 is covered solely by the solid portion of the air shutter member 160), and the vacuum source 182 of the vacuum assembly 180 is configured to extract particulate matter from outside of the saw compartment 104. When the vacuum assembly 180 is operating in the second mode of operation, the airflow stream with the particulate matter that is extracted from outside of the saw compartment 104 bypasses the first stage bag air filter 186, and the airflow stream passes only through the second stage drum air filter 184, thereby allowing large particular matter to be collected in the collection chamber defined by the box-like housing portion of the vacuum assembly 180, and small particular matter to be collected in a filter media of the second stage drum air filter 184.

Figure 13:
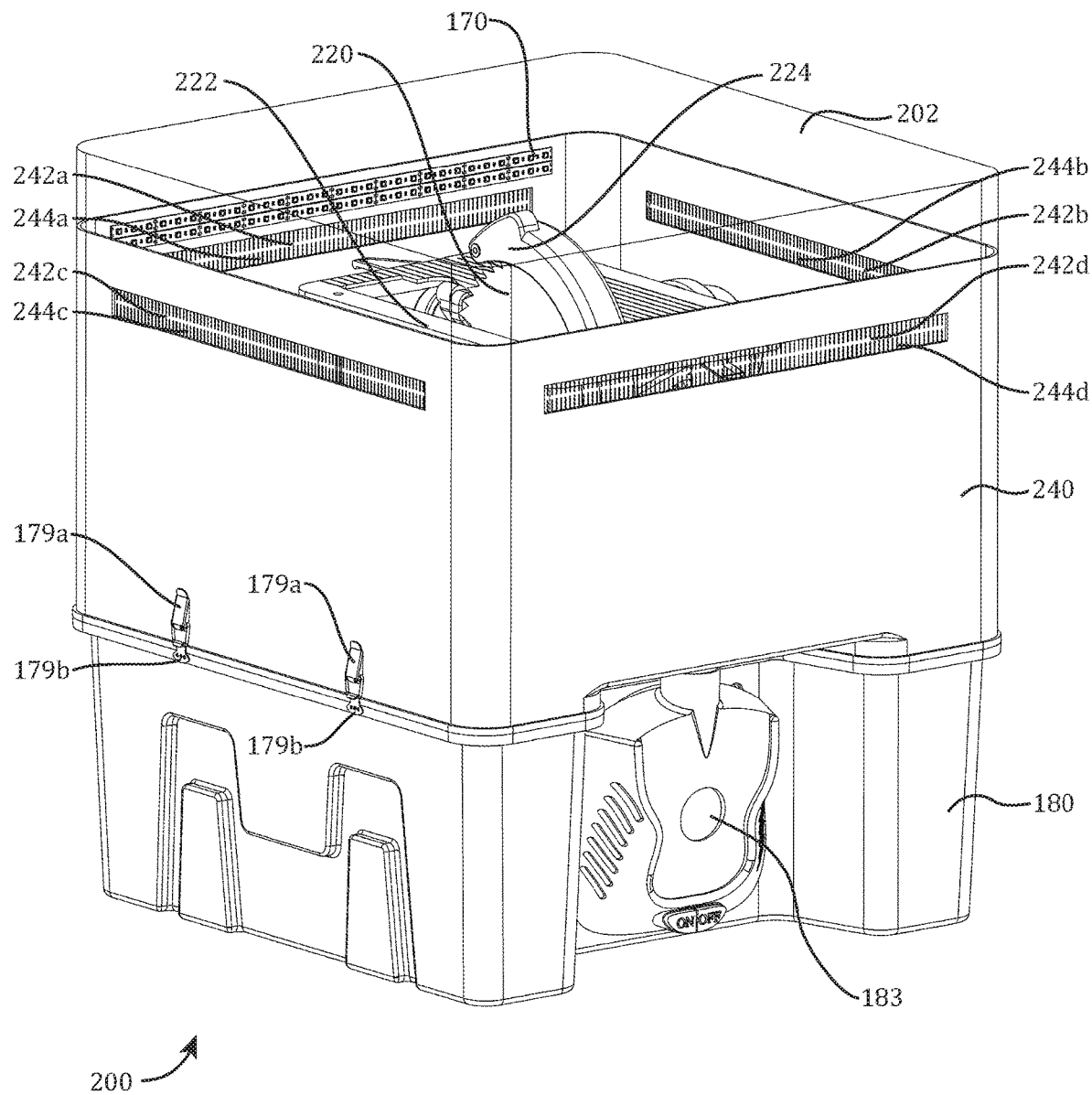
FIG. 13 is an assembled rear perspective view of the saw dust collection system and the saw of FIG. 12.
Figure 14:
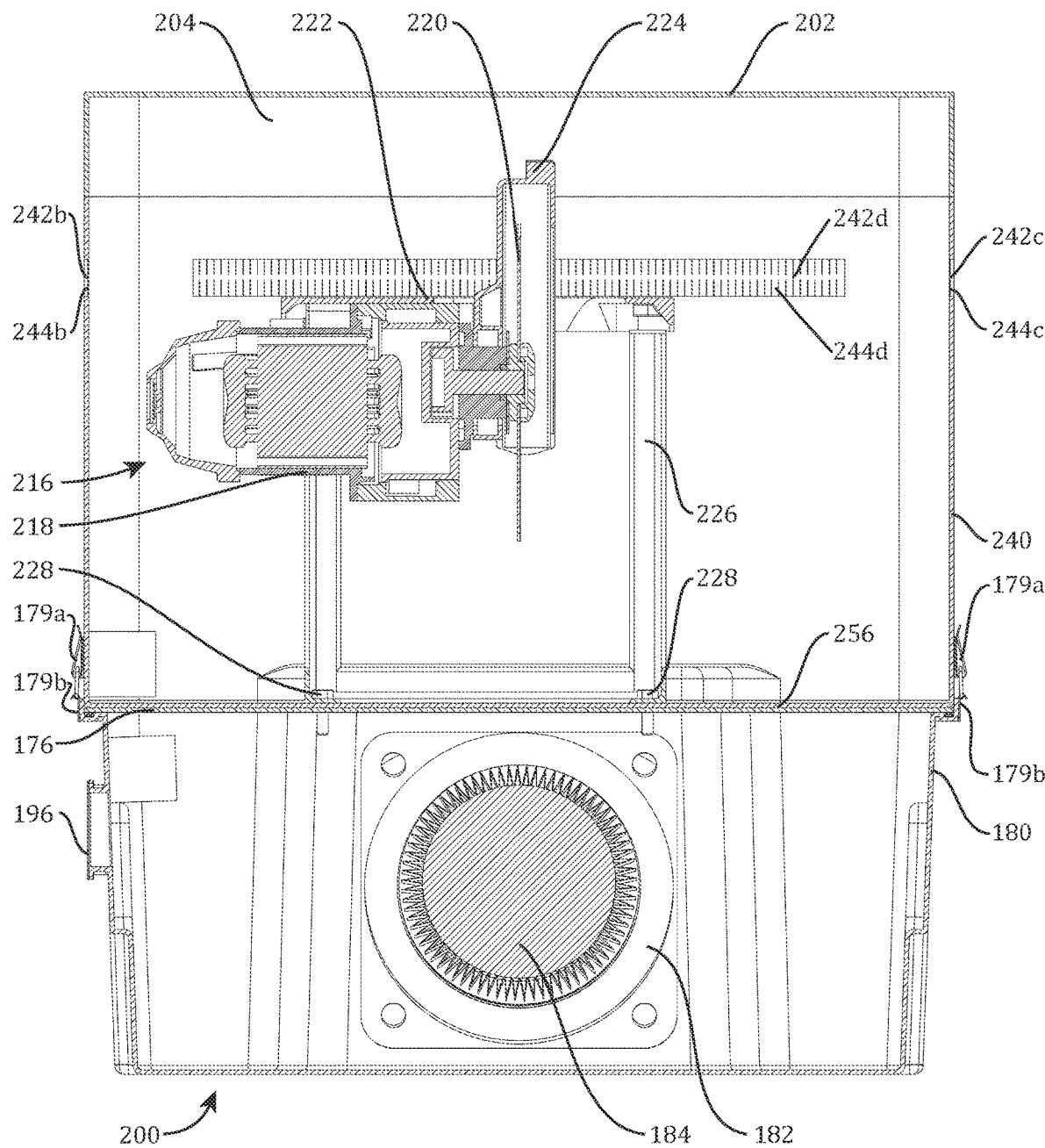
FIG. 14 is a sectional view of the saw dust collection system and the saw of FIG. 12, wherein the section is generally cut along the cutting-plane line B-B in FIG. 12.

A second illustrative embodiment of the saw dust collection system with a saw disposed therein is seen generally at 200 in FIGS. 12-14. Referring to these figures, it can be seen that, in many respects, the second illustrative embodiment is similar to that of the first illustrative embodiment. Moreover, many elements are common to both such embodiments. For the sake of brevity, the elements that the second embodiment of the saw dust collection system has in common with the first embodiment will not be discussed in detail because these components have already been described above.

Like the saw dust collection system 100 described above, the saw dust collection system 200 of the second illustrative embodiment is used for the containment of saw dust and particles generated by the cutting of a workpiece with the saw 216. In the second illustrative embodiment, referring initially to FIGS. 12 and 13, it can be seen that the saw dust collection system 200 generally comprises a vacuum assembly 180, the vacuum assembly 180 includes a vacuum source (e.g., with vacuum motor 182—see FIG. 18), the vacuum source 182 configured to create a vacuum for extracting the saw dust and particles from a cutting area surrounding the saw 216; a saw platform assembly 240 detachably coupled to the vacuum assembly 180, the saw platform assembly 240 comprising a floor 256 for supporting the saw 216 therefrom (see FIG. 17), the saw platform assembly 240 further defining a vacuum port (e.g., in the floor 256—see FIG. 19) fluidly coupled to the vacuum source 182; and a hood member 202 detachably coupled to the saw platform assembly 240, at least a portion of the hood member 202 being transparent so that a user of the saw is able to see through the hood member 202, the hood member 202 and the saw platform assembly 240 together defining a saw compartment 204 for containing the saw 216 therein and enclosing the cutting area around the saw 216 so as to prevent the saw dust and particles from entering the environment outside of the saw dust collection system 200. In addition to containing saw dust particles, the enclosed saw compartment 204 formed by the hood member 202 and the saw platform assembly 240 also prevents various types of bodily injuries to the user (e.g., hand injuries from sharp saw blades, eye injuries or other facial injuries from cut particles flying through the air, and inner ear injuries resulting from the saw noise) by shielding the user from the cutting area.

Figure 15:
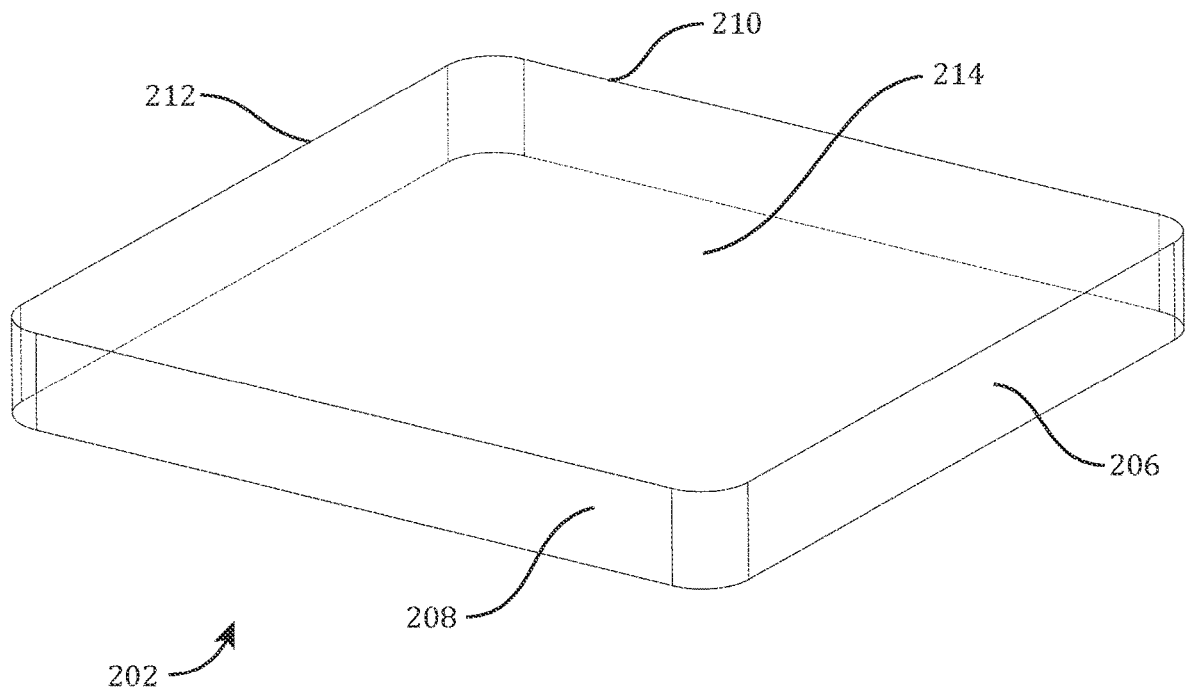
FIG. 15 is a perspective view of the hood member of the saw dust collection system of FIG. 12.

Now, with reference to FIGS. 12 and 15, the hood member 202 of the saw dust collection system 200 will be explained. As shown in FIG. 15, in the illustrative embodiment, the hood member 202 has a generally rectangular prism-like shape with a front wall panel 206, a first side panel 208, a second side panel 210 oppositely disposed relative to the first side panel 208, a rear wall panel 212 oppositely disposed relative to the front wall panel 206, and a top panel 214 connected to the top edges of the panels 206, 208, 210, 212. As compared to the hood member 102 of the first embodiment, the hood member 202 has a substantially smaller height and does not contain a hand and arm port. As shown in FIG. 15, in the illustrative embodiment, the hood member 202 is generally in the shape of a bottomless rectangular box with the panels 206, 208, 210, 212. The hood member 202 is removably attached to, and positioned onto the saw platform assembly 240 such that it encapsulates and seals the saw 216 together with the saw platform assembly 240, thereby forming an inner air tight interior cutting space 204 (see FIG. 14).

Similar to that described above for the first illustrative embodiment, the hood member 202 is made of a transparent material, such as a transparent polymeric material or plastic (e.g., polymethyl methacrylate (PMMA), otherwise known as Plexiglas®), which provides the user with an unobstructed view inside the hood member 202 into the interior space 204 at all times during operation. While the hood member 202 has a rectangular prism-like shape in the illustrative embodiment, it is to be understood that it can take on the form of many geometric shapes which cooperate with the saw platform assembly 240 so as to completely encapsulate and seal the saw 216, while providing adequate space for the operation thereof. Other envisioned shapes may include, but are not limited to, a dome shape, a frustoconical shape, a cylinder shape, or an elliptical shape.

In one or more embodiments, the peripheral bottom edge of the hood member 202 is provided with a gasket sealing member thereon so that the hood member 202 forms a substantially airtight connection with the saw platform assembly 240. In these one or more embodiments, the gasket sealing member may be formed from a compressible polymeric material or compressible rubber.

Figure 17:
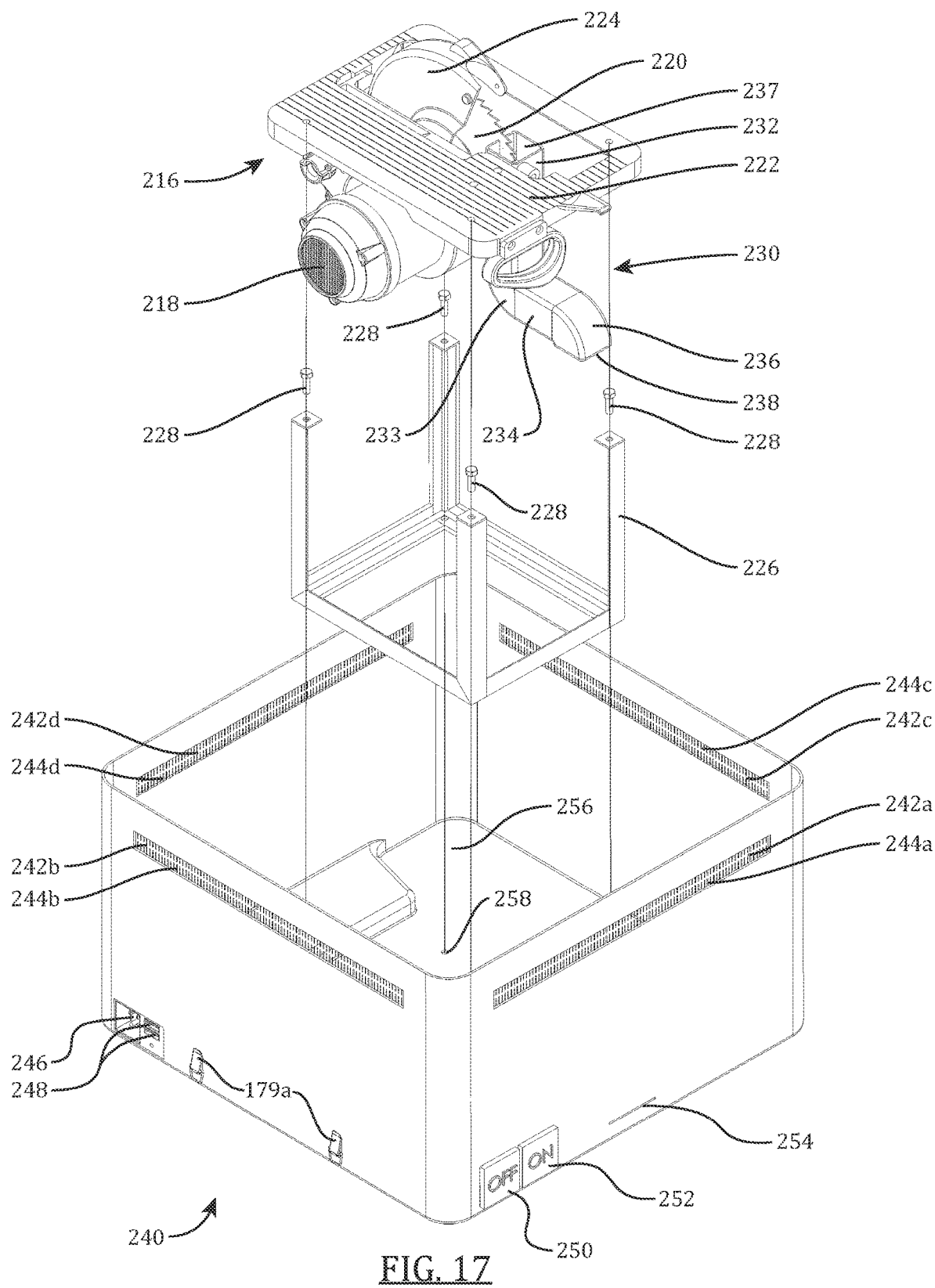
FIG. 17 is a perspective view of the saw platform assembly of the saw dust collection system and the saw of FIG. 12, wherein the manner in which the saw is attached to the saw platform assembly is illustrated.
Figure 18:
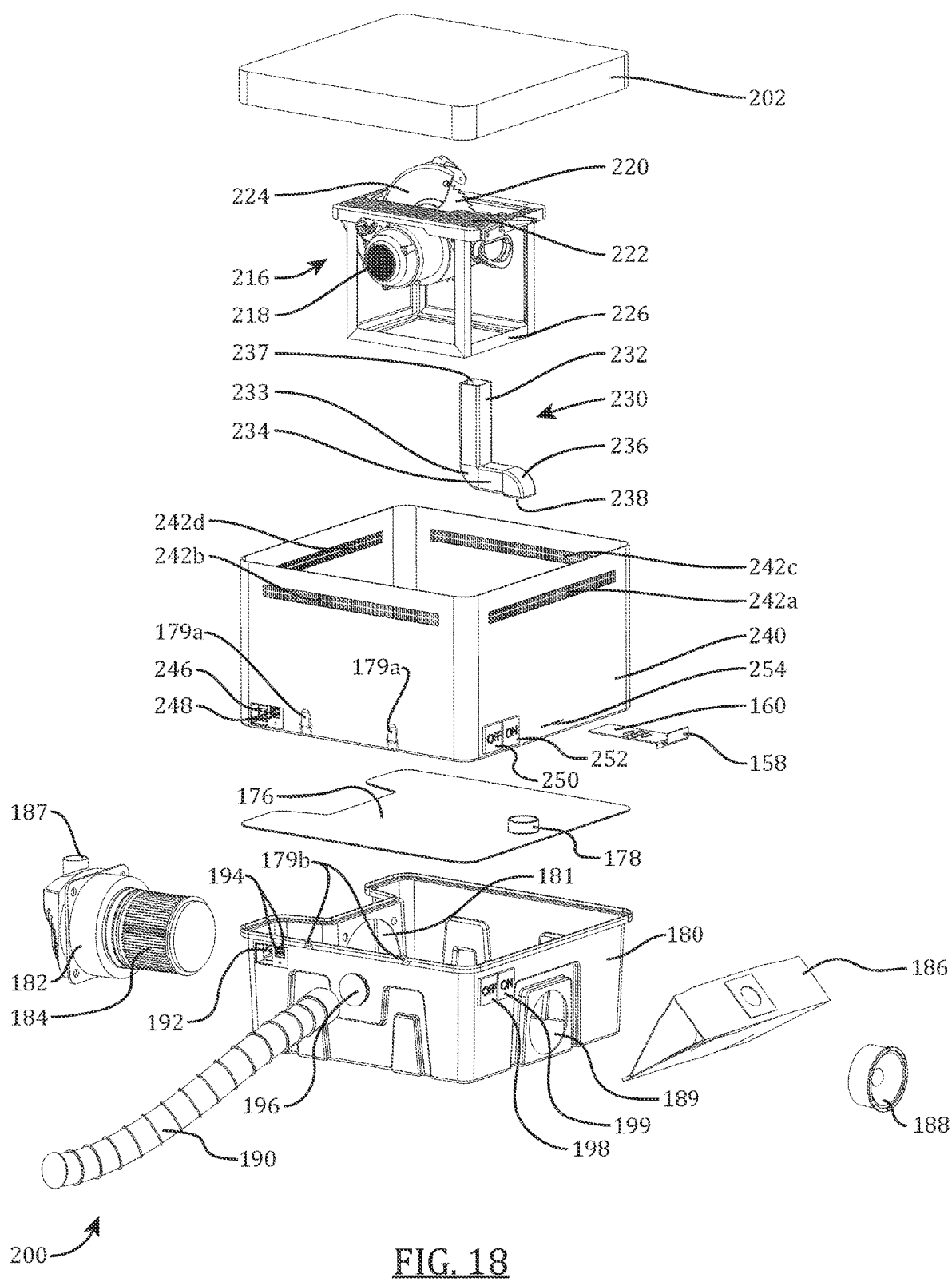
FIG. 18 is an exploded perspective view of the saw dust collection system and the saw of FIG. 12.

Next, turning to FIGS. 16-18, the saw platform assembly 240 of the illustrative saw dust collection system 200 will be described in detail. Initially, as shown in FIG. 17, it can be seen that the floor 256 of the saw platform assembly 240 is configured to accommodate the saw 216 mounted thereon. In particular, the saw platform assembly 240 comprises a universal saw mounting frame 226 that is configured to accommodate different types of saws mounted thereon. In the illustrative embodiment, the universal saw mounting frame 226 supports a mini table saw (see FIG. 17). Referring again to FIG. 17, it can be seen that the platform floor 256 comprises a plurality of fastener apertures 258 (e.g., four (4) fastener apertures 258) disposed therein for receiving respective fasteners (e.g., screws or bolts) for securing the universal saw mounting frame 226 to the saw platform assembly 240. Also, as shown in FIG. 17, the mini table saw assembly 216 is secured to the top of the universal saw mounting frame 226 by a plurality of fasteners 228 (e.g., screws or bolts). With reference to FIGS. 14 and 17-19, it can be seen that the mini table saw assembly 216 comprises a cutting surface 222, a saw blade 220 protruding above the cutting surface 222, a motor 218 which drives the saw blade 220, and a saw blade guard 224 that covers an upper portion of the saw blade 220 to protect a user from being inadvertently cut by the saw blade 220. In the illustrative embodiment, a typical workpiece is an elongated wood plank or other material suitable for cutting and form fitting for purposes of molding, trim, and flooring. Examples include wood trim, wood and composite flooring, and molding. As is known in the art of woodworking, a mini table saw is utilized to cut the workpiece at predetermined lengths (e.g., to form a custom wood floor of a dwelling).

In one or more alternative embodiments, the air intake grille of the motor 218 of the mini table saw 216 may be fluidly coupled to one or more ducts that extend from the air intake grille of the motor 218 to an air intake opening in one side of the saw platform assembly 240 or hood member 202. That way, the cooling air for the saw motor 218 may be extracted directly from the ambient environment outside of the saw compartment 204 so as to deliver cooler air to the motor 218. Also, the ducting of the cooling air for the motor 218 also advantageously prevents the dust-laden air present in the saw compartment 204 from being drawn into the interior of the motor 218, thereby preventing particulate build-up inside the motor 218. In these one or more embodiments, the air intake duct(s) for the saw motor 218 may be either flexible or rigid because, unlike the miter saw 120 described in the first embodiment, the mini table saw 216 of the second embodiment is stationary.

Figure 19:
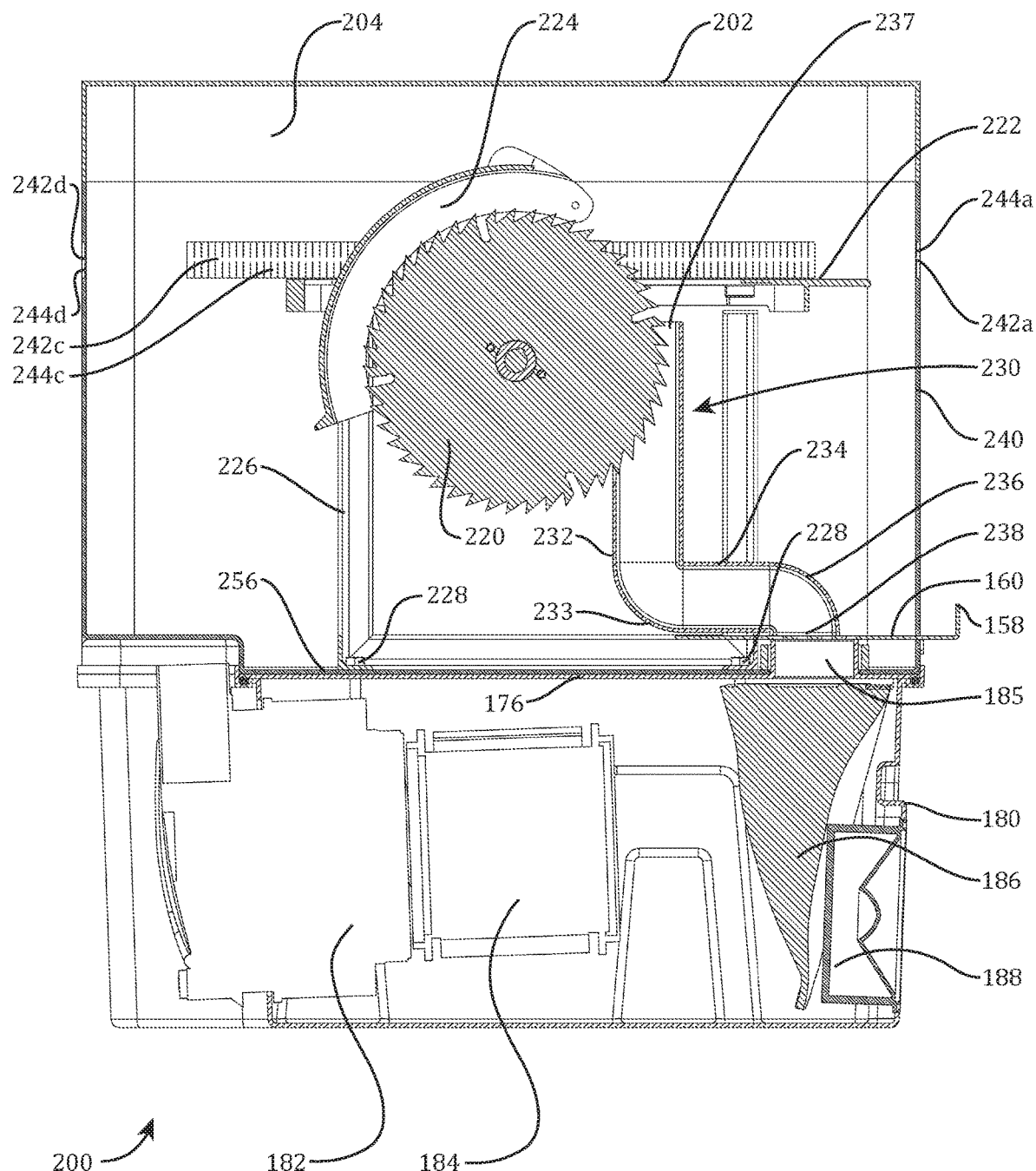
FIG. 19 is another sectional view of the saw dust collection system and the saw of FIG. 12, wherein the dust collection pipe of the saw platform assembly is illustrated in the sectional view.

As shown in FIGS. 17-19, in the illustrative embodiment, the saw dust collection system 200 further comprises a dust collection pipe 230 configured to extend from a location proximate to a blade 220 of the mini table saw 216 to the internal vacuum port of saw platform assembly 240 (see FIG. 19). As best illustrated in FIGS. 18 and 19, the dust collection pipe 230 comprises a vertical portion 232 with a slot formed therein for accommodating the saw blade 220, a first elbow portion 233, a horizontal portion 234 connected to the vertical portion 232 by the first elbow portion 233, and a downturned second elbow portion 236 connected to the internal vacuum port in the floor 256 of the saw platform assembly 240. In FIGS. 18 and 19, it can be seen that the vertical portion 232 of the dust collection pipe 230 defines an air inlet 237 at the saw blade 220, and the downturned second elbow portion 236 of the dust collection pipe 230 defines an air outlet 238 at the internal vacuum port in the saw platform floor 256. Advantageously, the dust collection pipe 230 allows the saw dust to be captured proximate to the saw blade 220 (i.e., the source of the saw dust), and then effectively and efficiently conveyed to the vacuum port in the floor 256 of the saw platform assembly 240. The dust collection pipe 230 acts as a source capture device to extract the saw dust at the location where the saw dust is produced.

Turning again to FIGS. 18 and 19, similar to the first embodiment described above, the saw platform assembly 240 further comprises an air shutter member 160 configured to selectively open or close the internal vacuum port of the saw platform assembly 240 so as to enable the vacuum source 182 of the vacuum assembly 180 to be used in the two different modes of operation described above with regard to the first embodiment. Similar to that described above with regard to FIG. 7A, when the air openings 162 in the air shutter member 160 are aligned with the vacuum port in the floor 256 of the saw platform assembly 240, airflow is permitted through the vacuum port so as to extract saw dust and debris from the saw compartment 204. Conversely, when the vacuum port in the floor 256 of the saw platform assembly 240 is covered solely by the solid portion of the air shutter member 160, airflow is prevented through the vacuum port so that the vacuum assembly 180 is able to be used as a shop-vac for removing debris outside of the saw dust collection system 200, as described in detail above. With reference to FIGS. 16-19, it can be seen that the air shutter member 160 is slidingly disposed in a slot 254 in a front sidewall of the saw platform assembly 240. As described above with regard to the first embodiment, a user adjusts the position of the air shutter member 160 (as opened or closed) by grasping and pulling or pushing on the upstanding handle 158 of the air shutter member 160.

With reference to FIGS. 12, 13, and 16-18, it can be seen that, in the illustrative embodiment, the saw platform assembly 240 further comprises a first workpiece insert slot 242a disposed in the front wall thereof, a second workpiece insert slot 242b disposed in the first side wall thereof, a third workpiece insert slot 242c disposed in the second side wall thereof, and a fourth workpiece insert slot 242d disposed in the rear wall thereof. The first workpiece insert slot 242a is oppositely disposed relative to the fourth workpiece insert slot 242d, and the first workpiece insert slot 242a is generally horizontally aligned with the fourth workpiece insert slot 242d. The second workpiece insert slot 242b is oppositely disposed relative to the third workpiece insert slot 242c, and the second workpiece insert slot 242b is generally horizontally aligned with the third workpiece insert slot 242c. As shown in FIG. 12, the workpiece insert slots 242b, 242c are configured so as to allow a workpiece to extend through the opposite sidewalls of the saw platform assembly 240 of the saw dust collection system 200, while the workpiece insert slots 242a, 242d are configured so as to allow a workpiece to extend through the oppositely disposed front and rear walls of the saw platform assembly 240. Advantageously, the paired workpiece insert slots 242a, 242d allow the workpiece to be oriented parallel to the saw blade 220 for lengthwise cuts of the workpiece, and the paired workpiece insert slots 242b, 242c allow the workpiece to be oriented perpendicular to the saw blade 220 for transverse cuts of the workpiece. As shown in the illustrative embodiment of FIGS. 12, 13, and 16-18, each of the workpiece insert slots 242a, 242b, 242c, 242d has a width that is substantially larger than the height thereof so as to form an elongate slot. Each workpiece insert slot 242a, 242b, 242c, 242d is generally shaped to receive a workpiece having a thin rectangular cross section (see e.g., FIG. 6). In the illustrative embodiment, the workpiece insert slots 242a, 242b, 242c, 242d are elevated at a height from the floor of the saw platform assembly 240 that is sufficient to place an inserted workpiece parallel and level with the cutting surface 222 of the saw 216. Moreover, in the illustrative embodiment, the workpiece insert slots 242a, 242b, 242c, 242d may further comprise respective flexible sealing members 244a, 244b, 244c, 244d (e.g., brush grommet members 244a, 244b, 244c, 244d), which operate to open and close the workpiece insert slots 242a, 242b, 242c, 242d during operation. The flexible sealing members 244a, 244b, 244c, 244d prevent saw dust and particles from entering the environment outside of the saw dust collection system 200. Thus, while inserting a workpiece, the flexible sealing members 244a, 244b, 244c, 244d move apart to allow ingress and egress of the workpiece into the interior cutting space 204, while simultaneously providing a seal around the workpiece. In an alternative embodiment, the flexible sealing members 244a, 244b, 244c, 244d may be in form of flexible flap members, rather than the brush grommet members 244a, 244b, 244c, 244d shown in the illustrative embodiment.

In an exemplary embodiment, each of the workpiece insert slots 242a, 242b, 242c, 242d may have a width of approximately 18 inches and a height of approximately 1 inch. In other embodiments, other suitable dimensions may be used for the workpiece insert slots 242a, 242b, 242c, 242d.

As described above for the first illustrative embodiment, the saw platform assembly 240 of the second embodiment further comprises a plurality of light emitting devices 170 for illuminating the saw compartment 204 containing the saw 216 (refer to FIG. 13). In FIG. 13, it can be seen that the light emitting devices 170 may be provided on the inner surface of the front wall of the saw platform assembly 240 for illuminating the saw compartment 204. Advantageously, the light emitting devices 170 facilitate more accurate cuts by the user by enhancing the visibility within the saw compartment 204. In the illustrative embodiment, the plurality of light emitting devices 170 are in the form of a plurality light-emitting diode (LED) lights (i.e., LED light strips).

In the illustrative embodiment, referring again to FIGS. 12 and 16, it can be seen that the saw platform assembly 240 further comprises an electrical connector 246 (i.e., an electrical receptacle for receiving the end of an electrical power cord) for providing power to the saw 216 and the light emitting devices 170. Also, as shown in these figures, the saw platform assembly 240 additionally comprises a power deactivation button 250 (i.e., "OFF" button) and a power activation button 252 (i.e., "ON" button) for deactivating and activating the saw 216 and the light emitting devices 170. As explained above, the vacuum assembly 180 is provided with a separate electrical connector 192 and separate power buttons 198, 199 for the vacuum source 182 so as to enable the vacuum source 182 and the saw 216 to be powered from different electrical receptacles of a residential or commercial building so as to prevent overloading the circuit breaker connected to a single electrical receptacle.

In one or more alternative embodiments, rather than being activated and deactivated by the power buttons 250, 252, the light emitting devices 170 may have dedicated power button (s) so as to enable the lights 170 to left on even when the saw 216 is not running.

Figure 16:
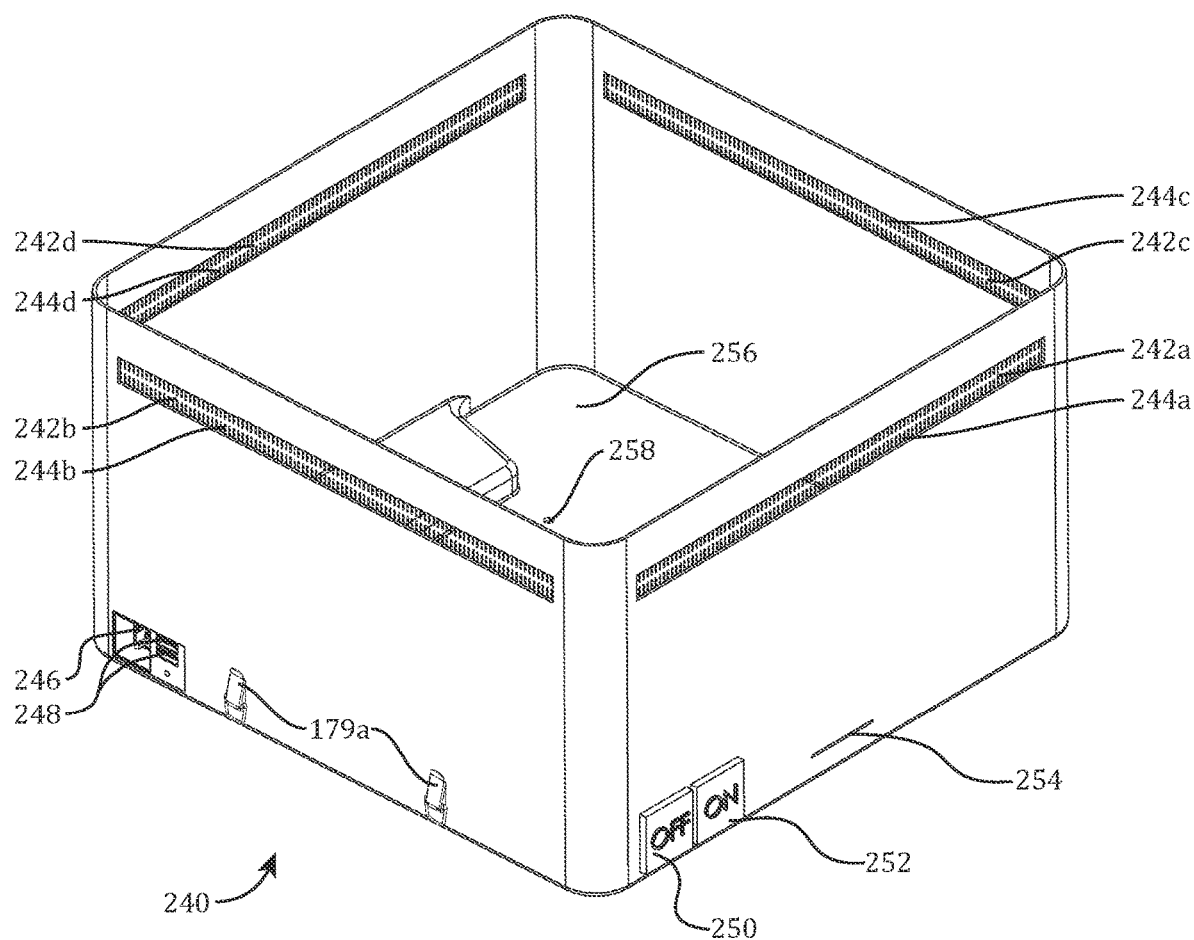
FIG. 16 is a perspective view of the saw platform assembly of the saw dust collection system of FIG. 12.

In addition, as shown in the illustrative embodiment of FIGS. 12 and 16, the saw platform assembly 240 may further comprise a plurality of Universal Serial Bus (USB) ports 248 (e.g., two (2) USB ports 248) for powering portable digital devices (a smartphone, a digital music player, etc.). For example, a user could power or charge his or her smartphone using one of the USB ports 248.

The vacuum assembly 180 of the second illustrative embodiment is the same as that described above for the first illustrative embodiment. As such, it is not necessary to reiterate the description of the vacuum assembly 180 will regard to the second embodiment. As explained above, the interchangeable nature of the vacuum assembly 180 allows the same vacuum assembly 180 to be used with a plurality of different saw platform assemblies 140, 240 containing different types of saws 120, 216 therein. Also, the saw dust collection system 200 has the two modes of operation described above in conjunction with the first embodiment.

Referring to FIGS. 1, 9, 12, and 20, the operation of the saw dust collection systems 100, 200 and the exemplary saws used therewith will now be described in detail. In the first embodiment, with initial reference to FIG. 1, a user activates the vacuum source 182 of the saw dust collection system 100 by depressing the "ON" button 199 on the front wall of the vacuum assembly 180, and he or she activates the miter saw 120 by depressing the "ON" button 156 on the front wall of the saw platform assembly 140. In the first embodiment, once power is supplied to both the miter saw 120 and the vacuum source 182 via the power buttons 156, 199, the user inserts one hand into the arm and hand port 106 of the hood member 102 in order to grasp the handle 122 of the miter saw 120, while simultaneously guiding a workpiece 172 into the workpiece insert slot 146a with his or her other hand so as to align the workpiece 172 into the cutting position for a desired cut. Once the workpiece 172 is aligned in the proper position relative to the saw blade 128, the user imparts a downward motion on the handle 122 of the miter saw 120, thus applying the rotating saw blade 128 to the workpiece 172 so as to make the cut. Simultaneously, the vacuum source 182 creates a vacuum at the internal vacuum port in the floor 166 of the saw platform assembly 140 proximate to the location where the workpiece 172 is being cut by the saw blade 128, thus extracting a significant portion of saw dust and fine particles generated by the cutting of the workpiece 172 (see FIG. 3). After the cut has been made, the user lifts the handle 122, which raises the saw blade 128 away from the cut workpiece 172. Thereafter, the power to both the miter saw 120 and the vacuum source 182 is turned off by depressing the "OFF" buttons 154, 198. In one or more embodiments, the user may turn off the saw 120, but then leave the vacuum source 182 running for a predetermined time period (e.g., 30 seconds or 60 seconds) after the saw 120 is turned off so that the vacuum source 182 can continually extract residual saw dust.

In the second embodiment, with initial reference to FIG. 12, a user activates the vacuum source 182 of the saw dust collection system 100 by depressing the "ON" button 199 on the front wall of the vacuum assembly 180, and he or she activates the mini table saw 216 by depressing the "ON" button 252 on the front wall of the saw platform assembly 240. In the second embodiment, once power is supplied to both the mini table saw 216 and the vacuum source 182 via the power buttons 252, 199, the user guides a workpiece into the workpiece insert slot 242a or 242b with his or her other hand(s) so as to align the workpiece into the cutting position for a desired cut. Once the workpiece is aligned in the proper position relative to the saw blade 220, the user cuts the workpiece. Simultaneously, the vacuum source 182 creates a vacuum at the air inlet 237 of the dust collection pipe 230 proximate to the location where the workpiece is being cut by the saw blade 220, thus extracting a significant portion of saw dust and fine particles generated by the cutting of the workpiece (see FIG. 19). After the cut has been made, the user removes the cut workpiece from the saw dust collection system 200. Thereafter, the power to both the mini table saw 216 and the vacuum source 182 is turned off by depressing the "OFF" buttons 250, 198. In one or more embodiments, the user may turn off the saw 216, but then leave the vacuum source 182 running for a predetermined time period (e.g., 30 seconds or 60 seconds) after the saw 216 is turned off so that the vacuum source 182 can continually extract residual saw dust.

Figure 20:
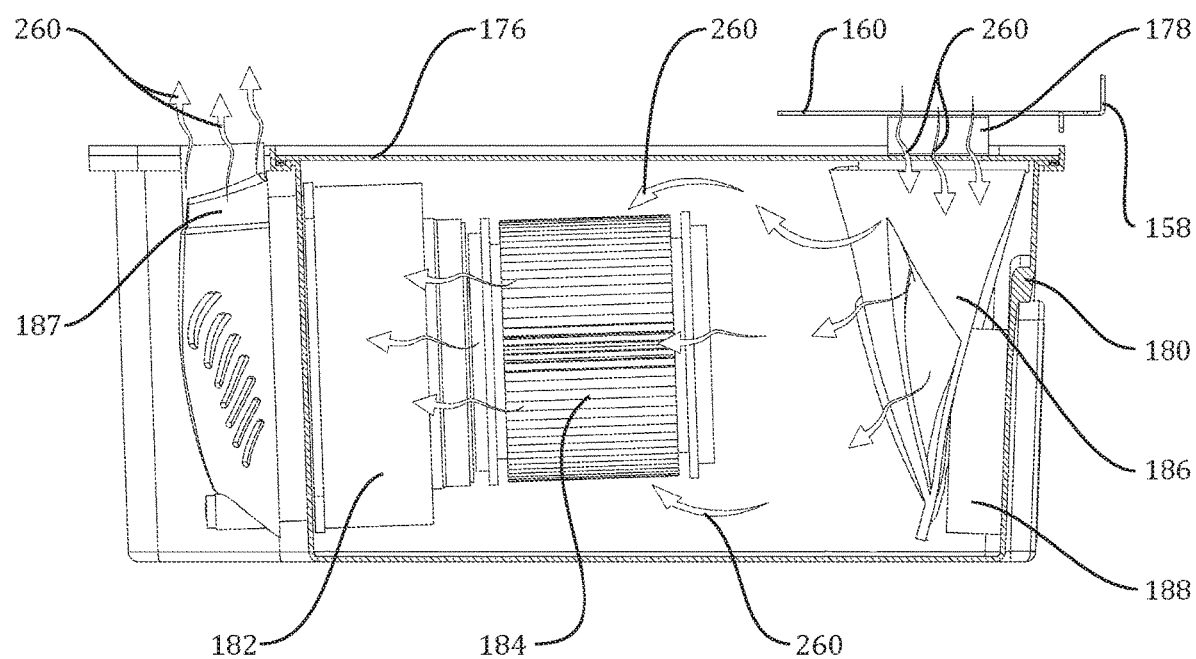
FIG. 20 is a sectional view illustrating the airflow through the vacuum assembly of the saw dust collection systems of FIGS. 1 and 12.
Figure 21:
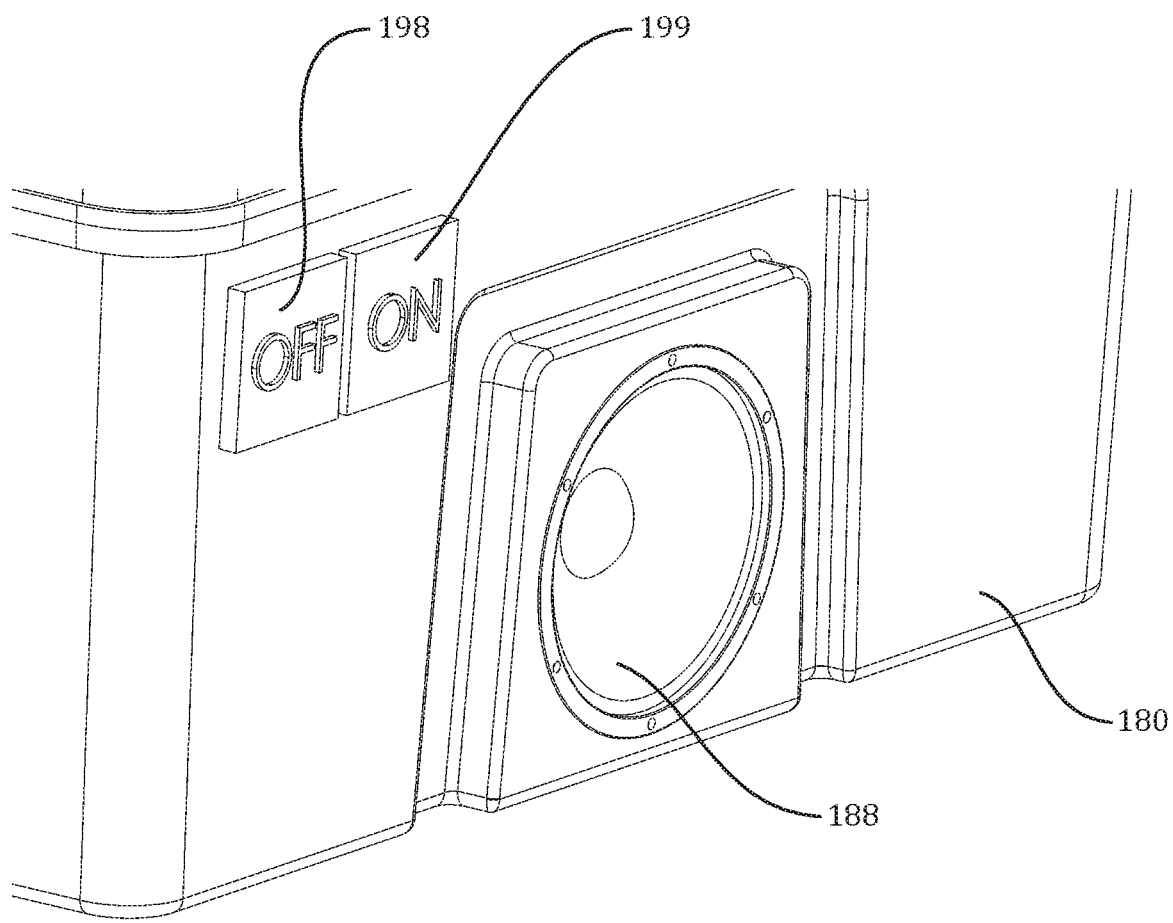
FIG. 21 is a partial frontal perspective view of the vacuum assembly of the saw dust collection systems of FIGS. 1 and 12, wherein the speaker in the front wall of the vacuum assembly is illustrated.
Figure 22:
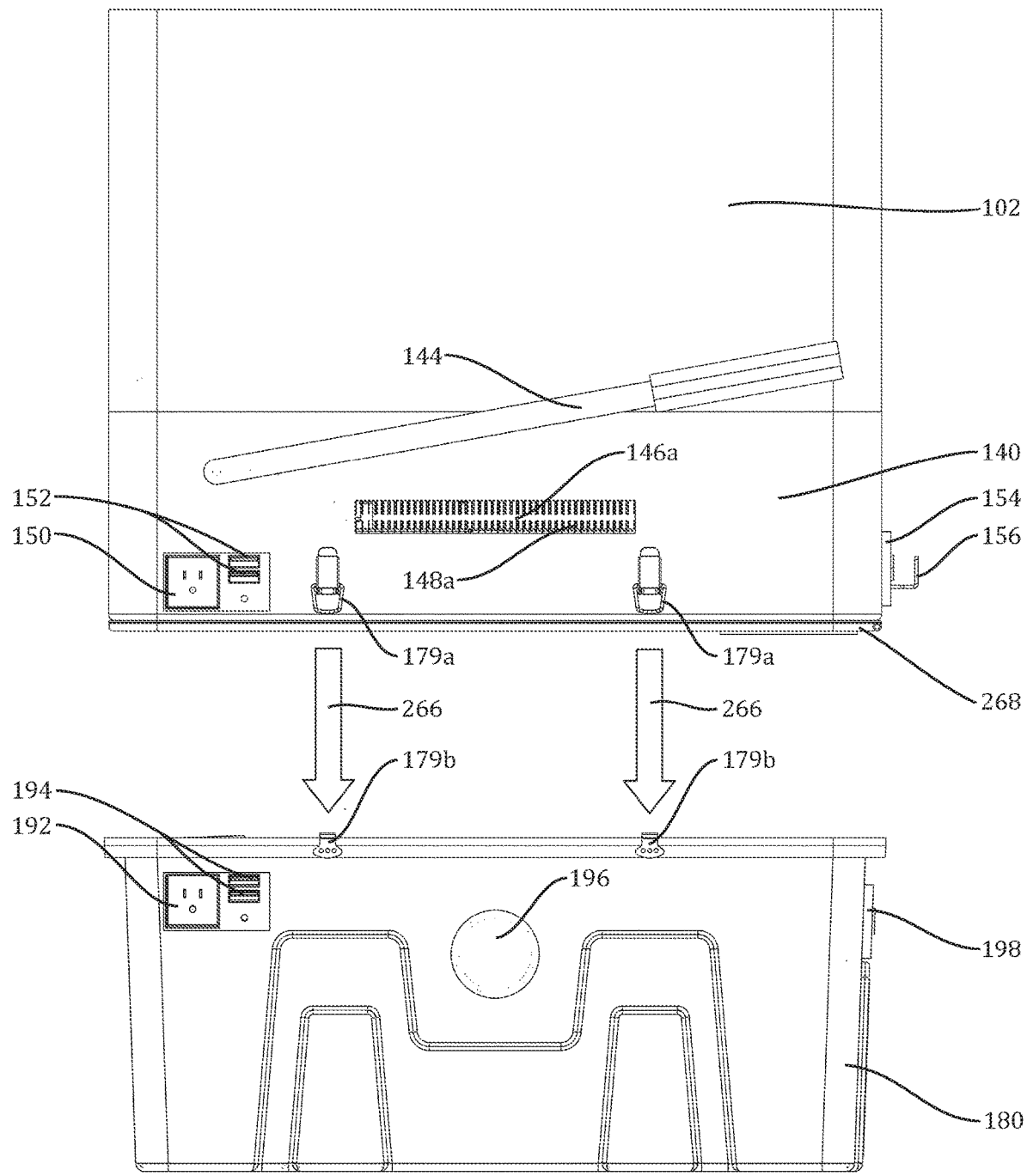
FIG. 22 is a side elevational view of the saw dust collection system of FIG. 1, wherein the attachment of the saw platform assembly to the vacuum assembly is illustrated.

The airflow through the components of the saw dust collection systems during the cutting operations described above is diagrammatically illustrated in FIGS. 9 and 20. These figures illustrate the first mode of operation described above, wherein the air shutter member 160 is in an open position (FIG. 7A position), and the vacuum source 182 of the vacuum assembly 180 is configured to extract the saw dust and particles from inside the saw compartments 104, 204. Initially, as shown in the top view of FIG. 9, the air (represented diagrammatically by arrows 197 in FIG. 9) is drawn into the saw compartment 104 of the saw dust collection system 100 through the oppositely disposed workpiece insert slots 146a, 146b by the vacuum created by the vacuum source 182. Once the air has entered the saw compartment 104, the saw dust particles from the cutting operations are entrained by the air, and then removed from the saw compartment 104 by virtue of being drawn into the air openings 162 of the air shutter member 160. Turning to FIG. 20, after passing through the openings 162 in the air shutter member 160, the particle-laden air stream (represented diagrammatically by arrows 260 in FIG. 20) travels through the air intake collar 178 in the top wall 176 of the vacuum chamber, and then into the first stage bag air filter 186. As explained above, the first stage bag air filter 186 initially removes the larger saw dust and particles generated by the cutting of a workpiece with the saw 120. Referring again to FIG. 20, it can be seen that, after the air stream 260 is initially cleaned by the first stage bag air filter 186, the air stream 260 passes through the second stage drum air filter 184, which removes the smaller particulate matter that is not removed from the air stream 260 by the first stage bag air filter 186. After the particulate matter is removed from the air stream 260 by the second stage drum air filter 184, the clean air is discharged to the ambient environment outside the saw dust collection system 100 through the vacuum motor discharge pipe 187 illustrated in FIG. 20.

The airflow through the saw dust collection system 200 is similar to that described above for the saw dust collection system 100, except for two primary differences. First, in the second embodiment, the air is drawn into the saw compartment 204 of the saw dust collection system 200 through the four (4) workpiece insert slots 242a, 242b, 242c, 242d of the saw platform assembly 240 by the vacuum created by the vacuum source 182, rather than the two (2) workpiece insert slots 146a, 146b. Secondly, once the air has entered the saw compartment 204, the saw dust particles from the cutting operations are entrained by the air, and then removed from the saw compartment 204 by virtue of being drawn into the air inlet 237 of the dust collection pipe 230, which then directs the air to the air openings 162 of the air shutter member 160. Other than these two differences, the rest of the airflow through the saw dust collection system 200 is the same as that described above for the saw dust collection system 100.

Advantageously, during the operation of the saw dust collection systems 100, 200 described above, the saw dust and other airborne particles are nearly completely contained within the interior saw compartments 104, 204, with a majority of the saw dust and other airborne particles being removed via the vacuum source 182 and trapped within the media of the filters 184, 186. That is, the saw dust collection systems 100, 200 provide superior containment of saw dust and other particles related to cutting wood and other workpiece materials while indoors. Thus, the saw dust collection systems 100, 200 described herein substantially eliminate any pollution caused by the saw dust and particles in the room of the building structure where cutting operations are being performed. As described above, the vacuum source 182 creates air suction in the interior saw compartments 104, 204 by drawing air through the workpiece insert slots 146a, 146b, 242a, 242b, 242c, 242d, thereby creating an invisible forced air shield so as to prevent the saw dust and other particles from entering the room of the building structure where cutting operations are being performed.

It is readily apparent that the aforedescribed saw dust collection systems 100, 200 offer many other advantages and benefits in addition to those described above. For example, in a remodeling project involving an inhabited residence, such as the installation of a hardwood floor, the saw dust collection systems 100, 200 allow the remodeling professional to make cuts inside the residence in immediate proximity to the floor installation project, rather than outside of the residence. This saves both time and money, and reduces the physical strain on the remodeling professional resulting from the frequent, inconvenient trips to outside of the residence. In addition, by encapsulating the cutting operation, the saw dust collection systems 100, 200 described herein protect the remodeling professional from all types of injuries (e.g., hand injuries from sharp saw blades, eye injuries or other facial injuries from cut particles flying through the air, and inner ear injuries resulting from the saw noise).

Any of the features or attributes of the above described embodiments and variations can be used in combination with any of the other features and attributes of the above described embodiments and variations as desired.

Although the invention has been shown and described with respect to a certain embodiment or embodiments, it is apparent that this invention can be embodied in many different forms and that many other modifications and variations are possible without departing from the spirit and scope of this invention. Also, while the invention has been described above for use in building construction projects, it is to be understood the invention is not limited to any particular application, but rather may be used in any application that would benefit from the functionality afforded by the invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. A saw dust collection system for containment of saw dust and particles generated by the cutting of a workpiece with a saw, the saw dust collection system comprising:
  a vacuum source, the vacuum source configured to create a vacuum for extracting the saw dust and particles from a cutting area surrounding the saw;
  a saw platform assembly, the saw platform assembly comprising a floor configured to support the saw thereon, the saw platform assembly further defining a vacuum port fluidly coupled to the vacuum source;
  a hood member disposed over the saw platform assembly, at least a portion of the hood member being transparent so that a user of the saw is able to see through the hood member, the hood member and the saw platform assembly together defining a saw compartment configured to contain the saw therein and enclose the cutting area around the saw so as to prevent the saw dust and particles from entering the environment outside of the saw dust collection system; and
  a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system.

2. The saw dust collection system according to claim 1, wherein the hood member further comprises a hand and arm port so as to allow the user to access the saw disposed in the saw compartment.

3. The saw dust collection system according to claim 1, wherein the vacuum port of the saw platform assembly is disposed in the floor of the saw platform assembly.

4. The saw dust collection system according to claim 1, wherein at least one of the workpiece insert slots comprises a flexible sealing member disposed therein, the flexible sealing member configured to prevent the saw dust and particles from entering the environment outside of the saw dust collection system.

5. A saw dust collection system for containment of saw dust and particles generated by the cutting of a workpiece with a saw, the saw dust collection system comprising:
  a vacuum assembly, the vacuum assembly including a vacuum source, the vacuum source configured to create a vacuum for extracting the saw dust and particles from a cutting area surrounding the saw;
  a saw platform assembly detachably coupled to the vacuum assembly, the saw platform assembly comprising a floor configured to support the saw thereon, the saw platform assembly further defining a vacuum port fluidly coupled to the vacuum source;
  a hood member detachably coupled to the saw platform assembly, at least a portion of the hood member being transparent so that a user of the saw is able to see through the hood member, the hood member and the saw platform assembly together defining a saw compartment configured to contain the saw therein and enclose the cutting area around the saw so as to prevent the saw dust and particles from entering the environment outside of the saw dust collection system; and
  a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system;
  wherein each of the vacuum assembly, the saw platform assembly, and the hood member is configured to be separately carried by the user to a jobsite, and then assembled at the jobsite prior to the user performing cutting operations with the saw.

6. The saw dust collection system according to claim 5, wherein the vacuum assembly of the saw dust collection system is configured to be interchangeably used with a plurality of different saw platform assemblies containing different types of saws therein, thereby enabling the user to selectively attach the vacuum assembly to a selected one of the saw platform assemblies being used at the jobsite at a particular time.

7. The saw dust collection system according to claim 5, wherein the saw platform assembly further comprises a plurality of first latch portions and the vacuum assembly further comprises a plurality of second latch portions, respective ones of the plurality of first latch portions configured to be coupled to respective ones of the plurality of second latch portions so as to allow the saw platform assembly to be detachably coupled to the vacuum assembly without the use of tools.

8. The saw dust collection system according to claim 5, wherein the saw platform assembly further comprises a workpiece hold-down subassembly configured to enable the user to hold the workpiece in place while the workpiece is being cut by the saw, the workpiece hold-down subassembly comprising at least one handle member disposed on the exterior of the saw platform assembly.

9. The saw dust collection system according to claim 5, wherein the saw platform assembly further comprises a plurality of light emitting devices for illuminating the saw compartment that is configured to contain the saw.

10. The saw dust collection system according to claim 9, wherein the plurality of light emitting devices are in the form of a plurality light-emitting diode lights.

11. The saw dust collection system according to claim 5, wherein the vacuum assembly further comprises a housing with a plurality of walls, at least one of the walls of the housing comprising a speaker for playing music at the jobsite, the speaker configured to be operatively coupled to a portable digital device of the user by means of a wireless personal area network.

12. The saw dust collection system according to claim 5, wherein the vacuum assembly further comprises a first electrical connector for providing power to the vacuum source and at least one first power button for activating and deactivating the vacuum source, and wherein the saw platform assembly further comprises a second electrical connector for providing power to the saw and at least one second power button for activating and deactivating the saw, the first and second electrical connectors enabling the vacuum source and the saw to be powered from different electrical receptacles of a residential or commercial building.

13. The saw dust collection system according to claim 5, wherein the saw platform assembly further comprises a universal saw mounting frame that is configured to support one of a plurality of different types of saws mounted thereon.

14. A saw dust collection system for containment of saw dust and particles generated by the cutting of a workpiece with a saw, the saw dust collection system comprising:
- a vacuum assembly, the vacuum assembly including a vacuum source, the vacuum source configured to create a vacuum for extracting the saw dust and particles from a cutting area surrounding the saw, the vacuum assembly further comprising an external vacuum port fluidly coupled to the vacuum source, the external vacuum port configured to receive a vacuum hose;
- a saw platform assembly coupled to the vacuum assembly, the saw platform assembly comprising a floor configured to support the saw thereon, the saw platform assembly further defining an internal vacuum port fluidly coupled to the vacuum source;
- a hood member coupled to the saw platform assembly, at least a portion of the hood member being transparent so that a user of the saw is able to see through the hood member, the hood member and the saw platform assembly together defining a saw compartment configured to contain the saw therein and enclose the cutting area around the saw so as to prevent the saw dust and particles from entering the environment outside of the saw dust collection system;
- a pair of workpiece insert slots, a first of the pair of workpiece insert slots being oppositely disposed relative to a second of the pair of workpiece insert slots, the workpiece insert slots being configured so as to allow a workpiece to extend through opposite sides of the saw dust collection system; and
- an air shutter member, the air shutter member configured to selectively open or close the internal vacuum port of the saw platform assembly so as to enable the vacuum source of the vacuum assembly to be used in two different modes of operation;
- wherein, in a first of the two modes of operation, the air shutter member is in an open position and the vacuum source of the vacuum assembly is configured to extract the saw dust and particles from inside the saw compartment; and
- wherein, in a second of the two modes of operation, the air shutter member is in a closed position and the vacuum source of the vacuum assembly is configured to extract particulate matter from outside of the saw compartment.

15. The saw dust collection system according to claim 14, wherein the vacuum source comprises a vacuum motor, and the vacuum assembly further comprises a first stage bag air filter, a second stage drum air filter with filter media, and a collection chamber; and
- wherein, when the vacuum assembly is operating in the second mode of operation, the airflow stream with the particulate matter that is extracted from outside of the saw compartment bypasses the first stage bag air filter, and the airflow stream passes only through the second stage drum air filter, thereby allowing large particular matter to be collected in the collection chamber of the vacuum assembly, and small particular matter to be collected in the filter media of the second stage drum air filter.

16. The saw dust collection system according to claim 15, wherein the first stage bag air filter is in the form of an angular bag air filter that is removably attached to a top wall of the collection chamber of the vacuum assembly.

17. The saw dust collection system according to claim 14, wherein the air shutter member is slidingly disposed in a slot in a peripheral sidewall of the saw platform assembly.

18. The saw dust collection system according to claim 14, further comprising a dust collection pipe configured to extend from a location proximate to a blade of the saw to the internal vacuum port of saw platform assembly.

19. The saw dust collection system according to claim 14, wherein at least one of the vacuum assembly and the saw platform assembly comprises a universal serial bus port for powering a portable digital device.

20. The saw dust collection system according to claim 14, wherein the first of the pair of workpiece insert slots is disposed in a first sidewall of the saw platform assembly, and the second of the pair of workpiece insert slots is disposed in a second sidewall of the saw platform assembly, the first sidewall of the saw platform assembly being disposed opposite to the second sidewall of the saw platform assembly.

* * * * *